(12) United States Patent
Wellbaum et al.

(10) Patent No.: US 7,173,930 B2
(45) Date of Patent: Feb. 6, 2007

(54) TRANSPARENT FLEXIBLE CONCATENATION

(75) Inventors: Tom Wellbaum, Santa Clara, CA (US); Daniel Klausmeier, Los Gatos, CA (US)

(73) Assignee: Ciena Corporation, Linthicum, MD (US)

( * ) Notice: Subject to any disclaimer, the term of this patent is extended or adjusted under 35 U.S.C. 154(b) by 1036 days.

(21) Appl. No.: 10/185,330

(22) Filed: Jun. 28, 2002

(65) Prior Publication Data

US 2003/0189925 A1 Oct. 9, 2003

Related U.S. Application Data

(63) Continuation-in-part of application No. 09/427,300, filed on Oct. 26, 1999, now Pat. No. 7,016,357.

(51) Int. Cl.
*H04L 12/66* (2006.01)
*H04L 12/28* (2006.01)
*H04J 3/24* (2006.01)
*H04J 3/04* (2006.01)

(52) U.S. Cl. ............... 370/356; 370/392; 370/412; 370/474; 370/536

(58) Field of Classification Search ............... None
See application file for complete search history.

(56) References Cited

U.S. PATENT DOCUMENTS 5,257,261 A * 10/1993 Parruck et al. ............. 370/522
5,455,832 A * 10/1995 Bowmaster ................. 714/712
6,262,975 B1 * 7/2001 Derbenwick et al. ....... 370/244
6,317,439 B1 * 11/2001 Cardona et al. ............ 370/503
6,671,271 B1 * 12/2003 Takemura et al. .......... 370/352
6,765,928 B1 * 7/2004 Sethuram et al. ........... 370/476
7,002,986 B1 * 2/2006 Roberts ...................... 370/465

FOREIGN PATENT DOCUMENTS

WO  WO 2004/004234 A1   1/2004

OTHER PUBLICATIONS

PCT, "International Preliminary Examination Report".
International Search Report for corresponding International Application WO2004/004234, dated Jan. 8, 2004.

* cited by examiner

*Primary Examiner*—Chi Pham
*Assistant Examiner*—Melanie Jagannathan
(74) *Attorney, Agent, or Firm*—Clements Walker; Christopher L. Bernard; Tyler S. Brown

(57) ABSTRACT

Data frames are converted to a format suitable for transparent, flexible concatenated transport such that a network element not supporting flexible concatenation may transparently pass the data frames. Flexible concatenation involves nonstandard data frames such as an STS-4c or an STS-Nc in which the time slots do not occupy rigidly defined contiguous time slots. In transparent flexible concatenation, the pointer from the parent time slot is used for each of the child time slots and the concatenation identifier is set to indicate no concatenation. In this way, the concatenated data appears to be a series of conventional STS-1s such that pointer processing may be successfully accomplished even by a network element not capable of handling non-standard concatenations. A downstream receive framer reconstructs the original STS-Nc based on the N STS-1s and a concatenation table the contents of which are shared between the transmit framer and the downstream receive framer.

20 Claims, 18 Drawing Sheets

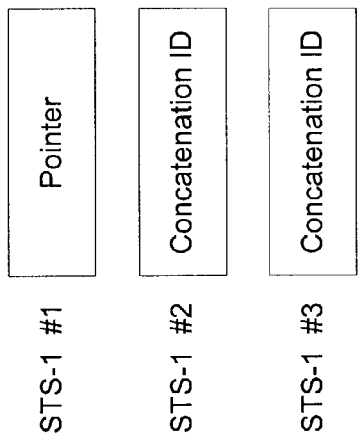
Figure 9(a)
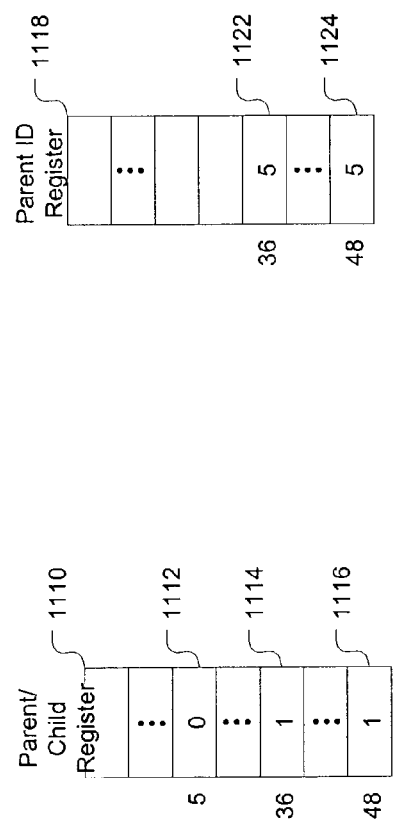
Figure 9(c)
Figure 9(b)

| STS-12c Number | STS-3c Number | STS-1 Number | |
|---|---|---|---|
| 1 | 1 | 1 | 17 | 33 |
| | 2 | 2 | 18 | 34 |
| | 3 | 3 | 19 | 35 |
| | 4 | 4 | 20 | 36 |
| 2 | 5 | 5 | 21 | 37 |
| | 6 | 6 | 22 | 38 |
| | 7 | 7 | 23 | 39 |
| | 8 | 8 | 24 | 40 |
| 3 | 9 | 9 | 25 | 41 |
| | 10 | 10 | 26 | 42 |
| | 11 | 11 | 27 | 43 |
| | 12 | 12 | 28 | 44 |
| 4 | 13 | 13 | 29 | 45 |
| | 14 | 14 | 30 | 46 |
| | 15 | 15 | 31 | 47 |
| | 16 | 16 | 32 | 48 |

Figure 13
(Conventional Art)

TRANSPARENT FLEXIBLE CONCATENATION

RELATED APPLICATIONS

This application is a continuation-in-part of U.S. patent application, Ser. No. 09/427,300 filed on Oct. 26, 1999 now U.S. Pat. No. 7,061,357, entitled "Methods and Apparatus for Arbitrary Concatenation in a Switch" and related to U.S. patent applications Ser. No. 09/259,263 filed on Mar. 1, 1999, entitled "Routing and Signaling in a SONET Network", and Ser. No. 09/493,344 filed Jan. 28, 2000, entitled "System and Method for Calculating Protection Routes in a Network Prior to Failure," which are each incorporated by reference in their entirety herein.

BACKGROUND OF THE INVENTION

Switches are provided in communication networks in order to direct traffic to a desired destination. As the use of networks has increased over time, so has the need for more bandwidth. Fiber optic networks were developed to meet this need and transmit data (e.g., voice and data signals) at high data rates. The American-based Synchronous Optical Network ("SONET") standard and the corresponding European equivalent standard, Synchronous Data Handling ("SDH"), are examples of two industry standards developed for the transmission of data over such fiber optic mediums. For simplicity the remaining description of optical-based networks will focus upon the SONET standard. However, those skilled in the art will recognize that the concepts as they pertain to SONET are also applicable to SDH and other data transmission protocols.

In a conventional SONET network, the network elements (or nodes), such as an add/drop multiplexers ("ADM"), have little or no information about other network elements in the network, thereby requiring manual intervention by a system administrator. In particular, conventional SONET networks required a system administrator to set up connection routes between ports coupled to the network elements of the network. A system administrator then would program the route in each network element along with the path from an ingress point to an egress point on the network. Typically, each network element in the network would have to be manually programmed to pass information in this manner. If a failure occurs in any one of the connections, the system administrator must manually reroute the connections by reprogramming the network elements.

In a SONET-based network data is transmitted as a series of multiplexed time slots or frames. The lowest data rate transmission typically within a SONET network is at a base rate of 51.84 Mbit/second, which in the electrical domain is referred to as a synchronous transport signal—level one ("STS-1") frame, and in the optical domain corresponds to an Optical Carrier—level 1 ("OC-1") frame.

Higher data rate frames can be formed from integer multiples of STS-1s, and are designated as STS-N/OC-N with N being a value, such as 3, 12, 48, 192, etc. For example, an OC-3 transmission is three times the base rate of OC-1.

As seen in FIG. 1, an OC-48 signal, when converted to corresponding electrical signals, includes 48 STS-1 frames. Each STS-1 frame is transmitted during a respective time slot, and comprises two components: a transport overhead and a payload. The transport overhead is provided in 9 rows of three bytes each (27 bytes total), and carries administrative information used by network elements to manage the transfer of the frame through the network. The payload, referred to as the Synchronous Payload Envelope ("SPE"), is provided in 9 rows of 87 bytes each (783 bytes total) and comprises the major portion of an STS-1. The SPE carries payload and STS Path Overhead ("STS POH") bytes, and may begin at any byte location within the payload envelope, as indicated by a pointer value in the overhead.

Certain broadband transmission protocols (e.g., ATM), however, include relatively large payloads which do not fit within a single STS-1. Thus, in order for these protocols to be transmitted over SONET signal, a plurality of STS-1s are concatenated together. Such concatenated STS-1 are referred to as STS-Nc, and are multiplexed, switched and transported as a single unit. The SPE of an STS-Nc includes N×783 bytes, which may be considered as an N×87 column×9 row structure. Only one set of STS POH is used in the STS-Nc, with the pointer always appearing in the transport overhead of the first of the N STS-1s that make up the STS-Nc.

The SONET standard, however, requires that the STS-1s that make up an STS-Nc occupy specific time slots. For example, FIG. 2 illustrates 48 time slots occupied by 16 OC-3cs transmitted within an OC-48 frame. In particular, as seen in FIG. 2, OC-3c #1 must occupy a "row" of time slots 1, 17 and 33, OC-3c #2 must occupy time slots 2, 18, and 34, and OC-3c #16, must occupy time slots 16, 32, and 48. In order to add a new OC-3c, one entire row shown in FIG. 2 must be removed or reallocated.

FIG. 3 illustrates specific time slots occupied by four OC-12cs within an OC-48 frame. Specifically, OC-12c #1 must occupy time slots 1–4, 17–20, and 33–36, OC12-c #2 must occupy time slots 5–8, 21–24, and 37–40, and OC-12c #4 must occupy time slots 13–16, 29–32, and 45–48. Likewise, in order to add a new OC-12c, an entire row shown in FIG. 3 must be removed or reallocated.

If time slots 1, 2, and 3 are dropped in the OC-48 frame shown in FIG. 2, and populated with data for an OC-3c, however, they could not be switched by current SONET equipment because they are not transmitted in a sequence conforming to the concatenation protocol described above. Rather, a conventional SONET network element would need to be reconfigured to thereby rearrange the remaining time slots so that a new OC-48 frame is created which does conform to the standard concatenation sequence. If reconfiguration is not performed, the empty time slots cause bandwidth fragmentation.

Reconfiguring SONET network elements, however, requires substantial down time causing disruption in the flow of data through a network. Thus, there is a need for a network element, which can arbitrarily (flexibly) concatenate time slots associated with an OC frame which are not provided in a given "row" or sequence required by SONET.

SONET/SDH defines concatenated payload structures in (GRE-253 and ITU G.707) for STS-Nc where N is a multiple of 3. Only STS-3c, STS-12c, STS-48c, STS-192c concatenated structures are in wide use. The STS-Nc payload structures are required to occupy rigidly defined contiguous timeslots within the STS-N data stream. This rigid industry standard requirement results in timeslot fragmentation and inefficient bandwidth utilization in a network where traffic is mixed with STS-1 and STS-Nc connections.

Timeslot fragmentation occurs as connections are added and deleted. For example, if an STS-3c connection is added to an STS-48, three timeslots in the STS-N must be available and those three times slots must be contiguous. If this condition does not exist, other existing connections must be re-groomed to make room for the STS-3c. The re-grooming process results in a traffic hit for the existing connections. If the traffic is not re-groomed, then bandwidth fragmentation occurs.

Flexible concatenation doesn't rigidly require the STS-Nc to occupy contiguous timeslots. Rather, the only requirement is that the parent timeslot containing the pointer value arrives into the framer before the child timeslots containing the concatenation identifier. Flexible concatenation, therefore, does not have any issues with timeslot fragmentation. If an STS-3c connection is added, as long as three timeslots exists within the STS-N, it can be added without having to be re-groomed.

Such flexibly concatenated data is defined as any STS-Nc sub-rate connection that is not an STS-3c/12c signal (e.g. STS-24c) or is an STS-3c/12c sub-rate signal which contains time-slots not in the specific ordering specified by Telecordia (BellCore) GR-253, January 1999.

Inefficient bandwidth utilization occurs when higher layer traffic is groomed into an STS-Nc that is larger than required. For example, a Gigabit Ethernet data stream occupies less than 24 timeslots, but in the standard SONET/SDH concatenation structure must occupy the entire STS-48c. Flexible concatenation allows for a flexible size STS-Nc payload structure in an STS-N. The flexible size STS-Nc payload capability allows flexibility in the size of the concatenated payload. For example, the Gigabit Ethernet can be transported in an STS-24c, which results in better bandwidth utilization.

Potential problems may exist within a network when a non-transparent network element, which does not support flexible concatenation, ("non-standard network elements") with respect to payload and pointer processing within a SONET/SDH network (or otherwise known as a facility) and such non-standard network elements are deployed between network elements that support flexible concatenation ("standard network elements").

When a standard network element with an OC-48 interface is used to transport flexibly concatenated payloads between standard network elements, it is important that network elements between the standard network elements transparently pass the SONET/SDH Line Overhead ("LOH"). In particular, it is important that the intermediate facility equipment not perform any pointer justifications (the pointer bytes are in the LOH). If the intermediate facility equipment is not a CoreDirector™ intelligent optical switch, it will not be able to detect and determine the non-standard concatenated payload structure in the SONET/SDH signal to properly adjust the pointers. What ends up happening is that the intermediate facility equipment does not adjust each STS-1 payload consistently in the non-standard STS-Nc and this will result in a corrupted payload at the onset of the first pointer justification.

In flexible concatenation, the child timeslots of the STS-Nc contain the concatenation identifier in the pointer value and only the parent timeslots contain pointer values.

Network elements, such as CIENA Corporation's CoreDirector™ intelligent optical switch uses flexible concatenation on its line-side facilities. For example, when a Sub-Network Connection ("SNC") utilizing flexible concatenation timeslots is established on a non-transparent facility, the SNC may not operate error free. This problem is due to the line-terminating network element in the middle of the network not forwarding the pointer bytes transparently across the network. These network elements instead perform pointer processing and regeneration only for standard concatenation timeslots and cannot perform pointer interpretation correctly for flexible concatenation.

Both the foregoing general description and the following detailed description explain examples of the invention and do not, by themselves, restrict the scope of the appended claims. The accompanying drawings, which constitute a part of this specification, illustrate apparatus and methods consistent with the invention and, together with the description, help explain the principles of the invention.

BRIEF DESCRIPTION OF THE DRAWINGS

The accompanying drawings, which are incorporated in and constitute a part of this specification, illustrate embodiments of the invention and, together with the description, serve to explain the advantages of the invention. In the drawings.

FIG. 2 illustrates the requirement imposed by SONET that concatenated time slots must occupy particular time slots;

FIG. 3 is a second illustration of the requirement imposed by SONET that concatenated time slots must occupy particular time slots;

FIGS. 9(a), 9(b), and 9(c) are block diagrams that illustrate how RPI 814 of FIG. 6 performs flexible concatenation;

FIG. 13 is a table illustrating standard concatenation for an OC-48 interface;

DETAILED DESCRIPTION OF THE INVENTION

The following detailed description refers to the accompanying drawings. The same reference numbers in different drawings identify the same or similar elements. Also, the following detailed description does not limit the invention. Instead, the scope of the invention is defined by the appended claims.

Figure 1:
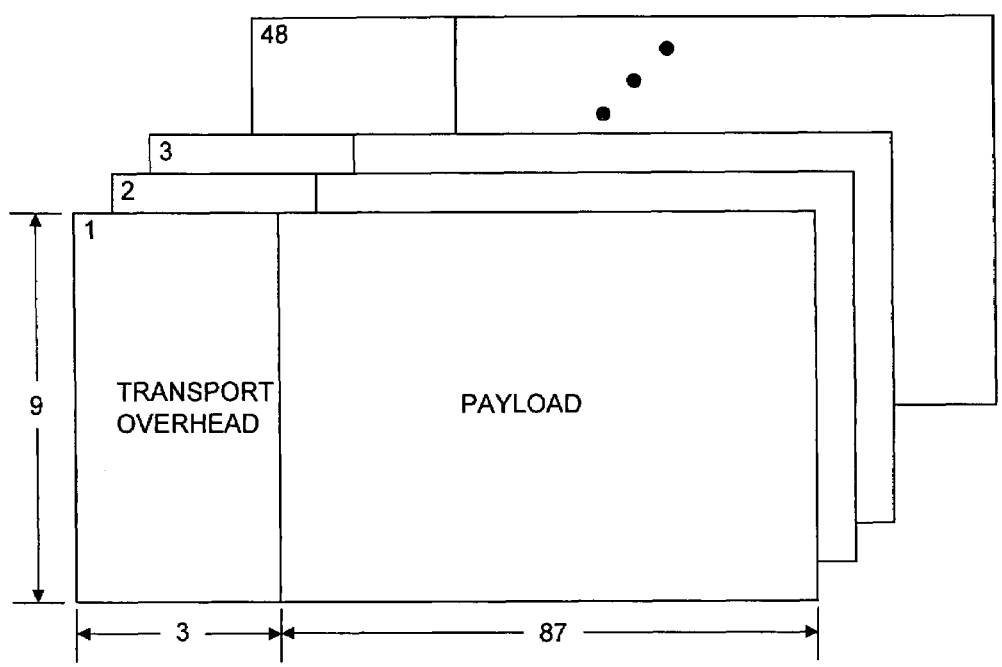
FIG. 1 shows 48 conventional STS-1 frames.

The present invention includes methods for providing connections in a network of connected network elements. Referring to FIG. 1, network 100 includes a number of interconnected network elements 101–106, which are configured in a mesh structure, in which, each network element is connected to one or more other network elements. Network user 10 is connected to network 100 through network element 101, and network user 20 through network element 106. One example of a network element is the CoreDirector™ switch manufactured by Ciena, Corporation. The connection between two network elements defines a span. Each of spans 151–159 can include one or more lines (e.g. optical fibers). When there is more than one line in a span, some of the lines can be used as working lines, while others can be used as protection lines.

The network elements in FIG. 1 may include multiple ingress ports and multiple egress ports. Each ingress port or egress port is connected to a physical line that can be an optical fiber, electric cable, an infrared wireless connection, RF connection, or microwave connection. Each physical line can include multiple channels. The multiple channels can be allocated by Time Division Multiplexing, Frequency Division Multiplexing, Code Division Multiplexing, or Dense Wavelength Division Multiplexing techniques. By using a cross-connect table, a network element can switch a data stream in a channel in an ingress port to a data stream in a channel in an egress port.

The network elements in FIG. 1 can be of the form of OXCs ("Optical Cross Connects"). An OXC is an optical switch with multiple ingress ports and multiple egress ports. Each ingress port or egress port can be connected to an optical fiber that may operate in a DWDM ("Dense Wavelength Division Multiplexing") mode. An OXC can be an Optical-Electrical-Optical switch or an Optical-Optical-Optical switch. How each data stream in an ingress port is switched to a data stream in an egress port is determined by the cross-connect table. An OXC can be configured to be Fiber-Switch Capable, Lambda Switch Capable, Time-Division Multiplex Capable, or any combination thereof.

Typically each network element supports both a signaling protocol and a routing protocol. For example, a network element such as the CoreDirector™ switch manufactured by CIENA Corporation can support an Optical Signaling and Routing Protocol ("OSRP"). Some of the routing and signaling functions of OSRP are disclosed in commonly owned and co-pending U.S. patent applications Ser. No. 09/259,263 filed on Mar. 1, 1999, entitled "Routing and Signaling in a SONET Network", and Ser. No. 09/493,344 filed Jan. 28, 2000, entitled "System and Method for Calculating Protection Routes in a Network Prior to Failure", which are each incorporated by reference in their entirety herein. The routing protocol in OSRP is responsible for discovery of neighbors and link status, reliable distribution of routing topology information and optimal route determination. The signaling protocol provides the capability of establishing, tearing down and modifying connections across a network of network elements.

A sub-network connection ("SNC") defines a grouping of one or more paths that pass through a network element in the network. A signaling and routing protocol (e.g., OSRP) is used to route, establish and maintain one or more sub-network connections in a given network element. The sub-network connections are characterized as path-based or composite. Path-based SNCs can include one or more synchronous transport signals (STS-1). A composite SNC can include multiple paths. Sub-network connections define a temporary (e.g., over a short period of time, where the connection is set-up and torn down at each call) allocation of resources in the network. SNCs are provisioned when a call is made.

The routing for a SNC can be explicitly or automatically defined. Provisioning of SNCs is provided through a signaling and routing protocol (e.g., OSRP). Explicitly provisioned SNCs include user (e.g., system administrator) -defined routes. Automatically provisioned SNCs make use of a routing protocol (e.g., as implemented in routing unit 250) for computing an optimal route. In either case, the route information is transmitted to other network elements in the network and cross-connects associated with the routes are configured. The SNCs are said to be temporary in that, resources associated with the route (e.g., bandwidth) can be dynamically re-allocated along the path. The reconfiguration includes the clearing of the set up connection (e.g., freeing the resources at a given network element).

Network resources associated with the SNCs are dynamically reconfigurable. Accordingly, the failure at a single point along the path from an ingress network element to an egress network element defining the route will not result in unused and unavailable resources. In one implementation, a user can configure one or more of the following parameters associated with a SNC including a local line on which the SNC originates, the identification (ID) of the network element on which the SNC terminates, the ID of the remote line on which the SNC terminates, a class of service, a maximum allowable delay, route setting including working and protection routes, preferred status, mesh restorability, revert configurations upon fail over and reversion timers.

Figures 2, 3:
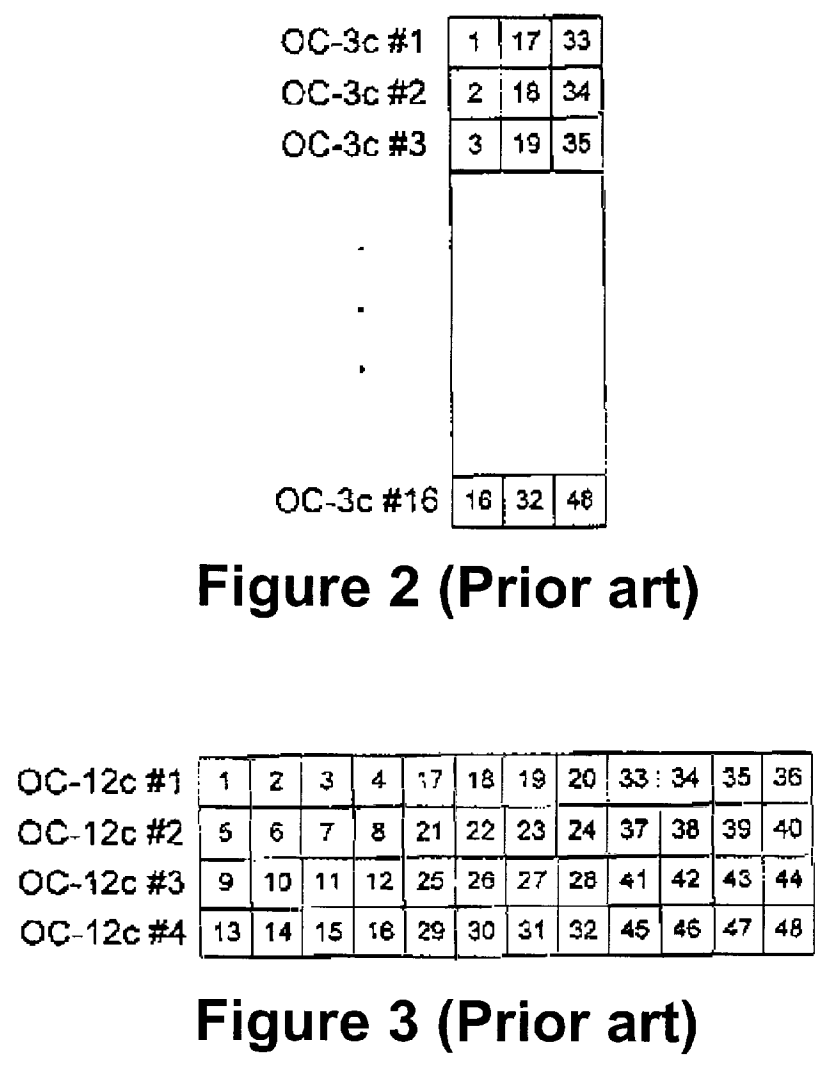

FIG. 2 illustrates, in detail, a network element 200 (e.g., an ingress network element 101) in accordance with one aspect of the present invention. Network element 200 includes ingress lines 210–213, and egress lines 220–223. Each ingress or egress line can support multiple channels. In one implementation, each ingress or egress line can support four channels c1, c2, c3, and c4. A channel in an ingress line can be logically connected to a channel in an egress line through a switch fabric 230. Switch fabric 230 is controlled by a cross-connect table 235.

Cross-connect table 235 may list multiple entries, and each entry specifies how a given channel in a given ingress line is connected to a channel in an egress line. For example, one entry in cross-connect table 235 may specify that a data stream in channel c3 in ingress port 212 be switched to a data stream in channel c1 in egress port 210. Each entry in cross-connect table 235 can be constructed using a path-specification table 260 or using a signaling protocol supported by the network element 200.

Path-specification table 260 may list multiple entries, and each entry specifies how a given path connection (either actual or virtual) can be constructed from a list of network elements, ports and channels. One possible way of specifying a given path connection is to use a Designated Transit List ("DTL"). A DTL uses a sequence of Network element Ids, Port IDs and optionally channel IDs to specify each network element, each port and each channel that the data traffic in a given path connection traverses from beginning to end.

Path connections can be constructed statically by pre-configuring the cross-connect table in all the network elements in a given path connection. A path connection can also be constructed dynamically if network element 200 supports both a routing protocol and a signaling protocol. A path between two users, between a user and a network element, or between two network elements can be determined by the routing protocol. The path can be specified by a DTL. The actual path connection along the path specified by the DTL can be established by the signaling protocol.

The routing protocol and signaling protocol in network element 200 may be supported by routing unit 240, signaling unit 250, and optionally port 215 and 225 for establishing out-of-band signaling and routing connections. Port 215 and 225 are optional, because in-band signaling and routing connections can be established using ingress port 210–213 and egress port 220–223 alone. Signaling unit 250 supports call processing, UNI ("User-to-Network Interface") signaling, and NNI ("Network-to-Network Interface") signaling. Routing unit 240 includes route determination functionality, topology exchange functionality, and a topology database.

APS ("Automatic Protection Switch") 232 in network element 200 monitors failure conditions on each of the spans (i.e., working and protection lines) connected to network element 200 and controls switching functions for data traffic on a failed line to a corresponding protection line. APS 232 may include a linear APS engine that operates to directly replace a failed working line with a protection line in the same span.

As noted above, concatenated time slots include a first time slot including pointer information, and subsequent time slots lacking such pointer information. Conventional SONET switching equipment sense concatenation indicators of the subsequent time slots, and based on the sequence in which these subsequent time slots are received, use the pointer of the first time slot as the pointer for the remaining time slots of the concatenated series. Once the pointer is known, a switch can properly route the received data without data loss.

As further noted above, if the concatenated time slots do not arrive at the switch in the precise sequence required by SONET, i.e., the time slots are arbitrarily concatenated, the switch cannot determine the correct pointer information, and thus, cannot properly route the data. Consistent with the present invention, however, a switch is provided that receives concatenated time slot identification data, typically from an external source. Based on this information, circuitry within the switch determines the pointer location within each of the concatenated time slots, and performs the required switching operations even if the time slots are arbitrarily concatenated. Moreover, the present invention can switch any suitable number of concatenated time slots, not just OC-3c and OC-12c, but OC-2c, OC-4c, etc.

Figure 4:
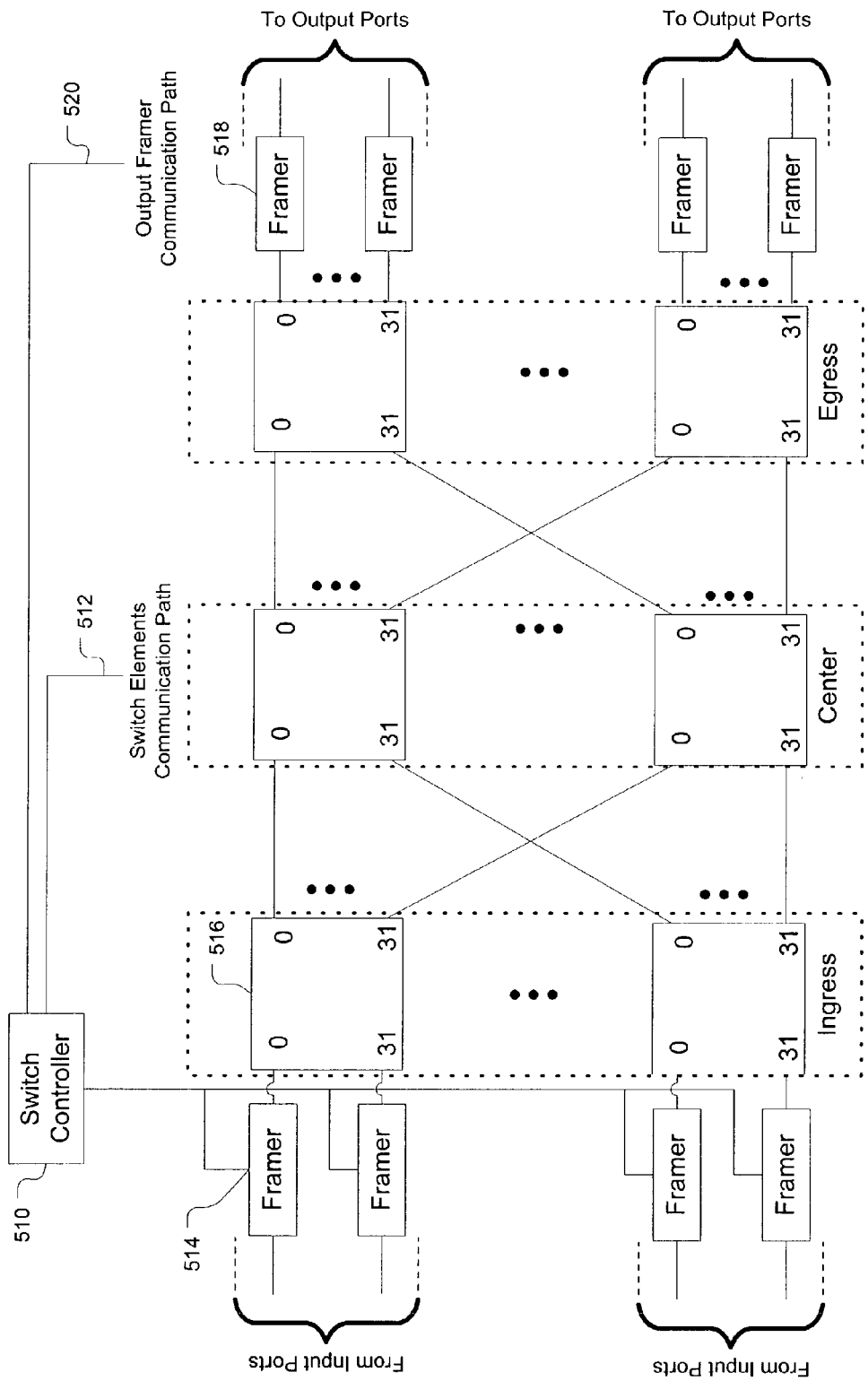
FIG. 4 shows an embodiment of a switch consistent with the principles of the present invention.

FIG. 4 shows an embodiment of a switch that may be used to perform flexible concatenation consistent with the principles of the present invention. The switch has three stages: an ingress stage, a center stage, and an egress stage. In this embodiment, each stage has n switch elements, numbered 0 to n−1, and each switch element has n input ports and n output ports, where n is an integer.

The inputs to the ingress stage are connected to input framers of the switch and the outputs of the egress stage are connected to output framers of the switch. Each ingress switch element output is connected by a bus to a respective center stage switch element. Similarly, each center stage element output is connected by a bus to an input of a respective egress element.

The buses entering the switch, between stages, and leaving the switch are time-division multiplexed to carry an appropriate number of time slots. A switch element is capable of connecting any switch element input to any output, and of mapping any time slot on any input port to any time slot on any output port. Data entering the switch is typically converted from SONET frames into internal switch frames including switch control information and several time slot groups containing data, as described for example in (U.S. Ser. No. 09/421,059, filed Oct. 19, 1999) entitled "A SWITCH MATRIX ARCHITECTURE AND TECHNIQUES FOR IMPLEMENTING RAPID HITLESS SWITCHOVER", incorporated by reference herein.

Each input time slot can be further time division multiplexed into m further time slots. Thus, since each switch element has n inputs and n outputs, and each line includes m time-division multiplexed time slots, each switch element is effectively an n×m switch element.

Each switch element in the ingress stage receives inputs from a respective framer. For example, as illustrated in FIG. 4, the 0 input of ingress switch element 0 receives information from framer 514. Framer 514 typically receives SONET frames from the input ports of the switch and converts the SONET frames into the internal switch frame format. Framer 514 communicates information regarding the incoming SONET frames to switch controller 510, and receives control information from switch controller 510.

Switch controller 510 receives information from the switch elements and transmits information to the switch elements over communication path 512 to control the overall operation of the switch. Switch controller 510 can also interface with a system administrator to supply, via communication path 520, time slot concatenation information to each output framer circuit, such as output framer 518. The time slot concatenation information will be described in greater detail below.

Figure 5:
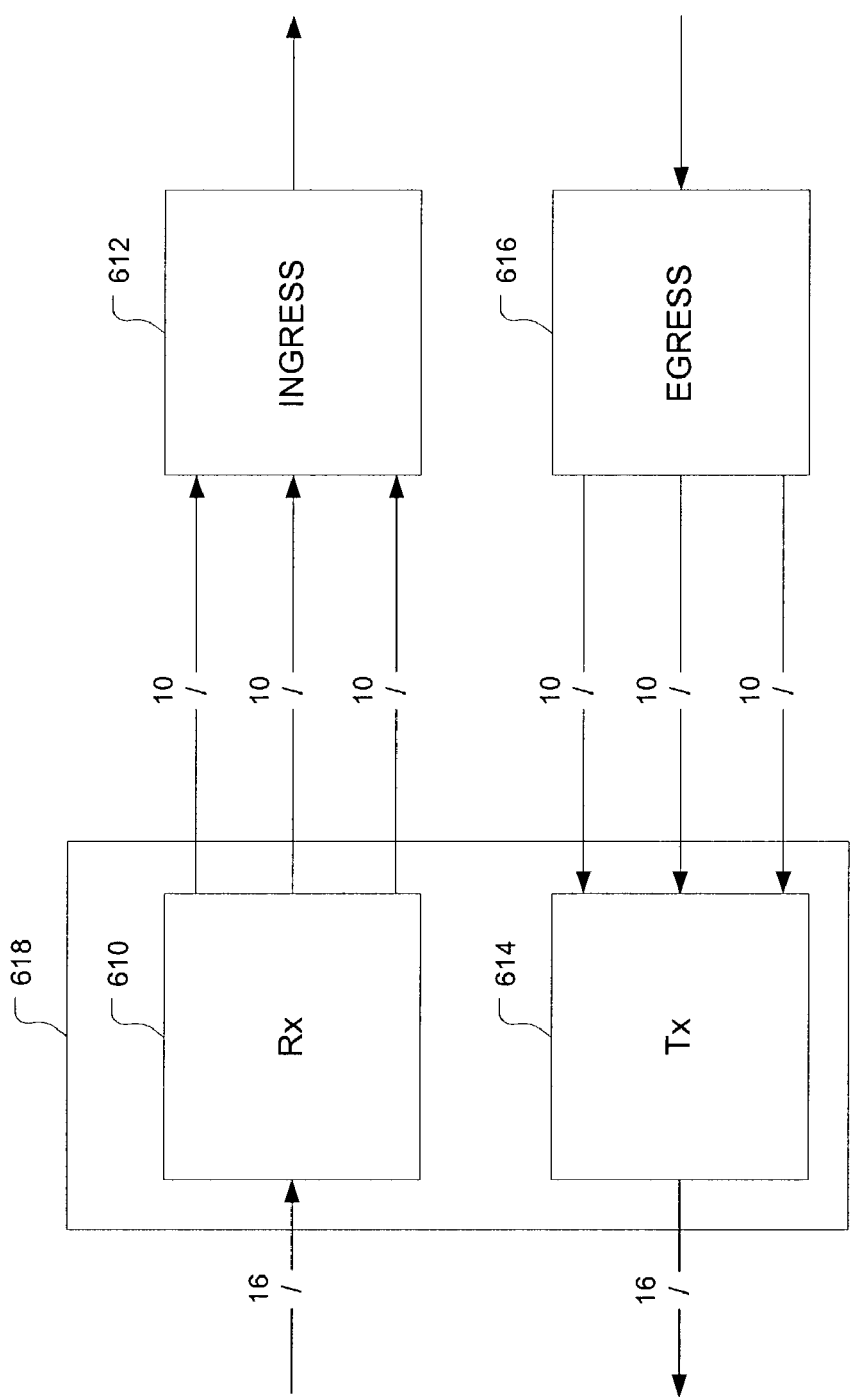
FIG. 5 is a block diagram illustrating a framer 618 that implements flexible concatenation methods and apparatus consistent with the invention.

FIG. 5 is a block diagram illustrating a framer 618 that implements flexible concatenation methods and apparatus consistent with the invention. Framer 618 implements an input and output framer pair, as shown in FIG. 4. For example, framer 618 may implement input framer 514 and output framer 518.

Framer 618 is comprised of an input circuit, Rx stage 610, and an output circuit, Tx stage 614. In one embodiment, Rx stage 610 receives data from a 16-bit bus, and outputs data to ingress stage 612 on three 10-bit buses. In one embodiment, the 16-bit bus carries SONET frames received from an optical interface and multiplexed onto the 16-bit bus. Rx stage 610 takes the data from the payload of each SONET frame, loads the data into internal frames having an appropriate internal frame format, and transmits them to ingress stage 612.

Figure 6:
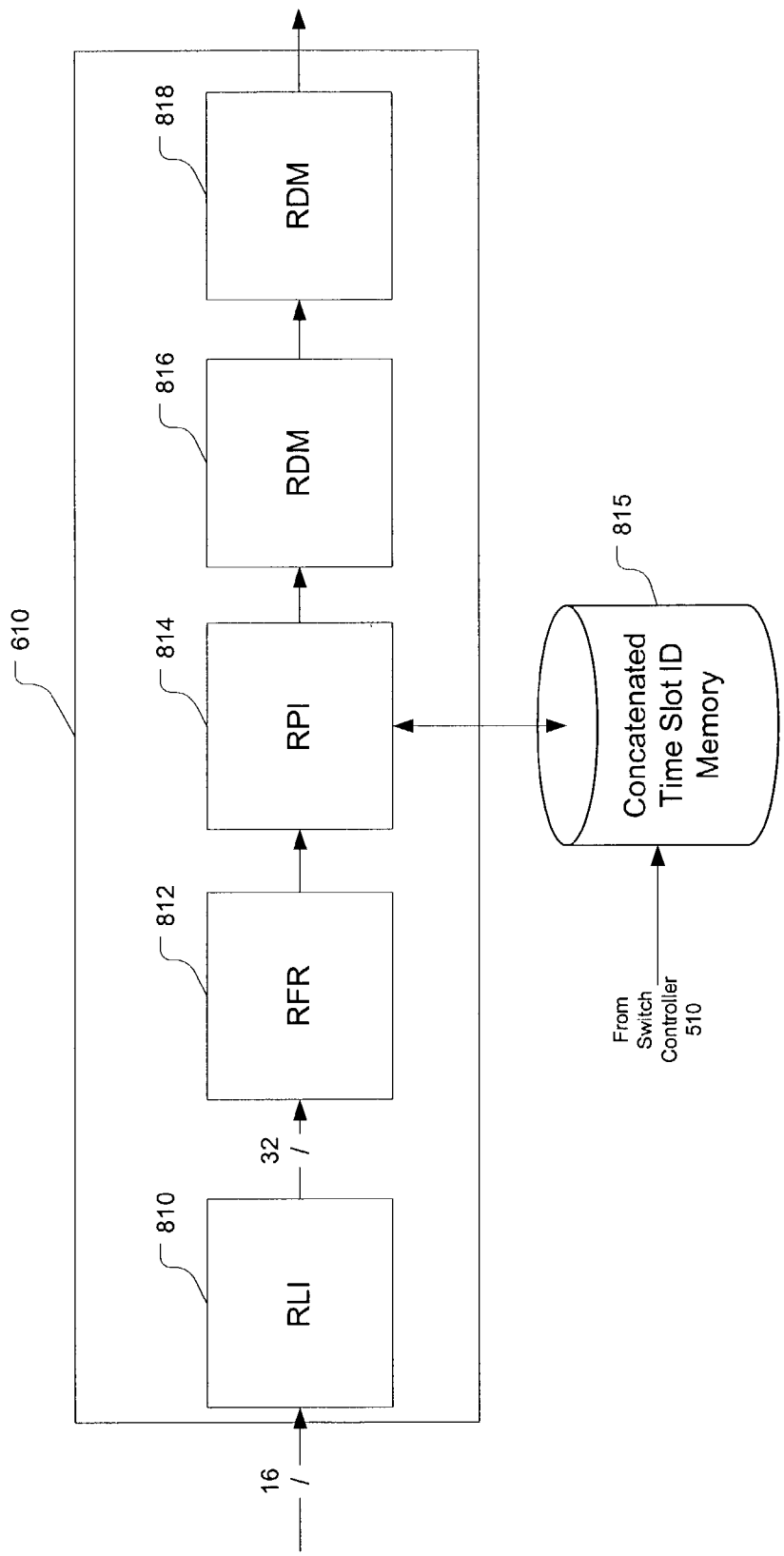
FIG. 6 is a block diagram illustrating Rx stage 610.

FIG. 6 is a block diagram illustrating Rx stage 610 in greater detail. Rx stage 610 is comprised of receive line information element (RLI) 810, receive framer (RFR) 812, a pointer determining circuit or receive pointer interpreter (RPI) 814, receive data memory (RDM) 816, and receive dropside information element (RDI) 818. RLI 810 receives data over the 16-bit bus and reformats the data to 32 bits, for example. RFR 812 receives the 32-bit data, and byte-aligns and frame-aligns the incoming data. The byte- and frame-aligned data is then transferred to RPI 814.

Figure 8:
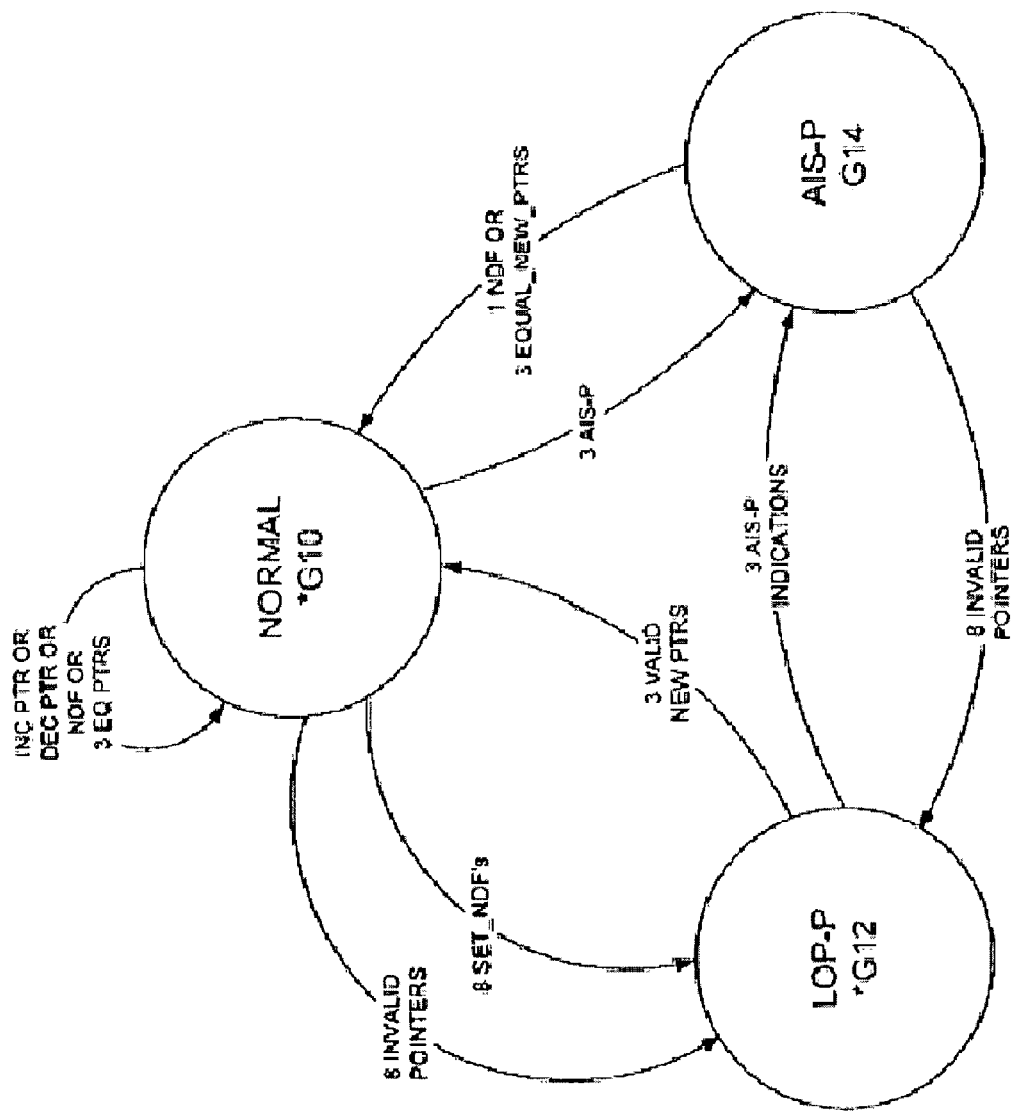
FIG. 8 is a state diagram illustrating the operation of RPI 814, consistent with SONET.

FIG. 8 is a state diagram illustrating the operation of RPI 814, consistent with SONET. RPI 814 has three states: normal 1010, loss of pointer (LOP-P) 1012, and alarm indication state (AIS-P) 1014. RPI 814 stays in normal state 1010 as long as one of increment pointer (INC PTR), decrement pointer (DEC PTR), new data flag (NDF), or three equal pointers (3 EQ PTRS) occurs. If eight invalid pointers are received or if eight set NDF's, then RPI 814 moves to LOP-P state 1012.

From LOP-P state 1012, RPI 814 moves to normal state 1010 upon receiving an indication that three valid pointers have been received (3 VALID NEW PTRS). RPI 814 moves from LOP state 1012 to AIS-P state 1014 upon receiving three AIS-P indications (3 AIS-P INDICATIONS).

From AIS-P state 1014, RPI 814 moves to normal state 1010 upon receiving an indication that one NDF (1 NDF) or three equal new pointers (3 EQUAL_NEW_PTRS) are received. RPI 814 moves from AIS-P state 1014 to LOP-P state 1012 upon receiving an indication that eight invalid pointers have been received (8 INVALID POINTERS).

Figure 7:
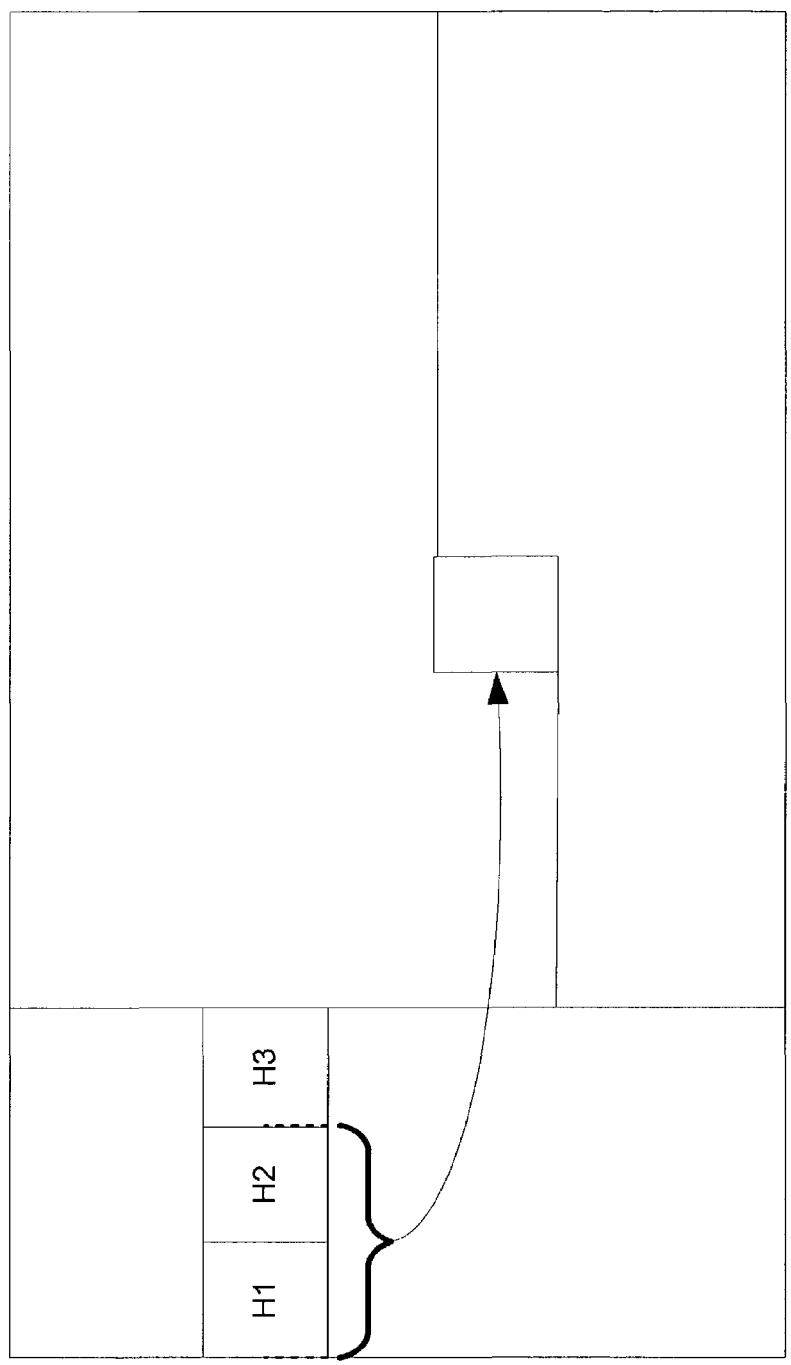
FIG. 7 illustrates how the transport overhead carries information defining where the data in the payload begins.

RPI 814 performs pointer interpretation on both concatenated and non-concatenated time slots. FIG. 7 illustrates a pointer in the transport overhead that defines where data begins in the payload. As is generally understood, the transport overhead includes H1, H2, and H3 bytes. The H1 and H2 bytes provide a pointer having a value defining the start of the payload of the STS-1, as indicated by the arrow in FIG. 7. Pointers are generally used to compensate for variations between rates of incoming data supplied to the switch and outgoing data from the switch. For example, RPI 814 can use pointer information to insert extra payload bytes (also commonly referred to as "negative byte stuffing") or remove payload bytes (also commonly referred to as "positive byte stuffing"), as required, so that SONET frames are input to and output from the switch at the same rate.

For non-concatenated time slots, RPI 814 performs conventional pointer processing. In the case of arbitrarily concatenated frames, however, RPI 814 accesses a memory 815 containing concatenated time slot identification in order to determine the pointer associated with each of the concatenated time slots. Two sub-memories or tables are provided in memory 815, the contents of which will next be described, by way of example, with reference to FIGS. 9(a) to 9(c).

FIG. 9(a) illustrates an OC-3c having three STS-1's. As noted above, in SONET, each STS-1 of an OC-3c would be required to be located in three particular time slots of the 48 available time slots (see FIG. 2). With flexible concatenation, however, the three STS-1's may not be in particular time slots. Therefore, a mechanism is needed to determine which three STS-1's comprise an OC-3c. In particular, the first STS-1 ("parent") of the concatenated time slots is identified, and its pointer is used as the pointer for the remaining concatenated STS-1 time slots ("children"). From this, the pointer for the OC-Nc group of time slots can also be determined. Typically, the pointer is defined by the parent of the particular arbitrarily concatenated OC-Nc.

In FIG. 9(a), STS-1 #1 is the parent and contains the pointer, and STS-1 #2 and STS-1 #3 are children and therefore contain concatenation indicators, indicating they have a parent. If an STS-1 has a concatenation indicator, RPI 814 must obtain the pointer value from the parent. In the example shown in FIG. 9(a), RPI 814 obtains the pointers for children STS-1 #2 and STS-1 #3 from parent STS-1 #1.

FIG. 9(b) illustrates the first sub-memory, parent/child register 1110, contained within memory 815. Parent child register 1110 receives data from switch controller 510 defining which STS-1's are parents and which are children. Parent/child register 1110 is comprised of 48 one-bit locations respectively corresponding to each STS-1. Parent/child register 1110 is typically used if the STS-1s are transmitted as part of an OC-48 frame. If other frames are transmitted, e.g., OC-N, N one-bit locations are used. The value of each bit indicates whether the corresponding STS-1 is a parent or a child. Typically, a "0" indicates a parent, and a "1" indicates a child. In the example shown in FIG. 9(b), the bit corresponding to STS-1 #5 contains a "0," indicating a parent, the bit for STS-1 #36 contains a "1," indicating a child, and the bit corresponding to STS-1 #48 contains a "1" as well, indicating a child. Memory locations corresponding to other non-concatenated time slots also store a "0". Accordingly, a second memory table, parent ID register 1118, is used to specifically identify the parent for a given child.

FIG. 9(c) illustrates a second sub-memory, parent ID register 1118, for maintaining the ID for each parent. Parent ID register 1118 also receives data from switch control circuit 510, and is comprised of 48 storage locations respectively corresponding to each STS-1 of an OC-48 frame. If, for example, an OC-192 frame is transmitted, Parent ID register 1118 would include 192 storage locations. Those memory locations corresponding to child time slots store data indicating their respective parent time slot. Thus, for example, storage location 36 stores the value 5, indicating that time slot 36 is a child, and time slot 5 is its parent. In addition, storage location 48, also stores the value 5, thereby indicating that time slot 5 is the parent of time slot 48 as well. Therefore, based on the contents of sub-memories 1110 and 1118, RPI 814 determines which time slot is a parent, and which slots are the associated children. RPI 814 then extracts the pointer value from the parent time slot and uses it for each of the corresponding children. As a result, the pointer for each concatenated time slot can be obtained.

Returning to FIG. 6, pointer information output from RPI 814 is supplied to RDM 816, which acts as a first-in first-out (FIFO) buffer to store data received from RPI 814. The pointer information is used to synchronize the time slots stored in the FIFO and perform byte stuffing. Next, the time slots are fed to RDI 818, where they are modified to have the above-described internal frame format. RDI 818 receives signals (not shown), such as frame synchronization signals and timing signals that determine when a frame will be launched from Rx stage 610 to ingress stage 612, thereby insuring that the internal frames enter the switched fabric in a synchronized manner.

Rx stage 610 handles the frames coming into the switch and transferred to the switch fabric. As frames come out of the switch fabric, they are handled by Tx stage 614.

Figure 10:
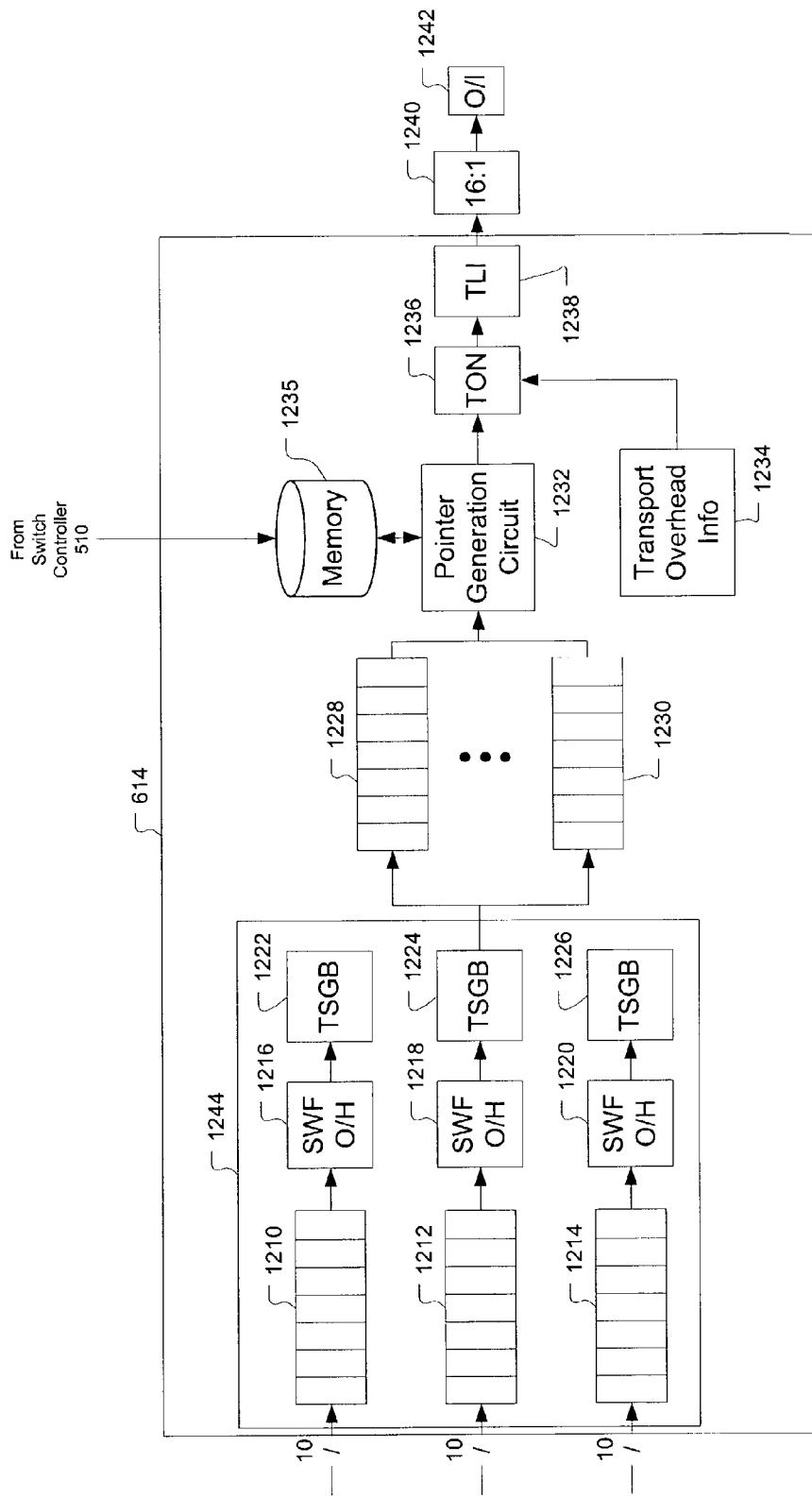
FIG. 10 is a block diagram of an embodiment of Tx stage 614 of FIG. 6 consistent with the principles of the invention.

FIG. 10 is a block diagram of an embodiment of an output circuit or Tx stage 614 of FIG. 6 consistent with the principles of the invention. Tx stage 614 receives internal switch frames from the switch fabric, pulls the data out of the appropriate internal switch frames in accordance with the arbitrarily concatenated time slots created by Rx stage 610, and sends the data out on SONET frames.

Tx stage 610 is comprised of a Tx data interface (TDI) 1244, 48 FIFO buffers, FIFO #1 1228 through FIFO #48 1230, an additional pointer determining circuit or pointer generation (PTG) circuit 1432, transport overhead information module (TOI) 1234, and transmit line interface (TLI) 1238. The output of Tx stage 614 is comprised of, for example, a 16:1 output multiplexer 1240 and output interface (O/I) 1242.

TDI is comprised of FIFO's 1210, 1212, and 1214, switch frame overhead processors (SWF O/H's) 1216, 1218 and 1220, and time slot group buffers (TSGB's) 1222, 1224, and 1226. TDI 1242 receives internal frames from three 10-bit buses. The frames are first stored in FIFO's 1210, 1212, and 1214, which adjust the frames to correct timing problems caused by skew and other factors.

The internal frames are transferred from FIFO's 1210, 1212, and 1214, to SWF O/H's 1216, 1218 and 1220, which process the internal switch frames. Internal switch frames are comprised of alternating TSG's and processor communication channels (PCC's). Each TSG comprises a group of eighteen time slots, for example, with one byte of data transmitted per time slot. The PCC's are passed from switch controller 510 through the framer to the switch elements. For example, commands may be sent by switch controller 510 to the switch elements over PCC's. Responses and error notifications are sent by the switch elements back to the host over the PCC's. Each PCC consists of five five-byte subfields which are interleaved with data bytes. Each internal switch frame also includes idle bytes 320 that are inserted between switch frames to align them on system-dictated switch frame boundaries and to synchronize clocks in the system.

SWF O/H's 1216, 1218 and 1220, process the internal switch frames by pulling out the transport overhead information, PCC's, and TSG's from the internal switch frames. SWF O/H's 1216, 1218 and 1220, transfer the TSG's to TSGB's 1222, 1224, and 1226. The TSG's are then multiplexed from TSGB's 1222, 1224, and 1226 onto a 32-bit data bus, to 48 FIFO's, FIFO #1 1228 to FIFO #48 1230. The 48 FIFO's store the payload to be loaded into outgoing SONET frames.

The 48 FIFO's transfer the SONET payload data to PTG 1232. PTG 1232 operates similar to RPI 814 in Rx stage 610. More particularly, PTG 1232 performs pointer generation for the outgoing frames in accordance with data originating in switch controller 510 and stored in memory 1235. PTG 1232 multiplexes the payloads over a 32-bit bus to TOM 1236. TOM 1236 also receives transport overhead information from TOI 1234 over another 32-bit bus, for example, and combines the payloads from PTG 1232 and the transport overhead information from TOI for transfer to TLI 1238. TLI 1238 transfers the data over a 16-bit bus to the output of the framer, comprised of 16:1 multiplexer 1240 and O/I 1242.

Figure 11:
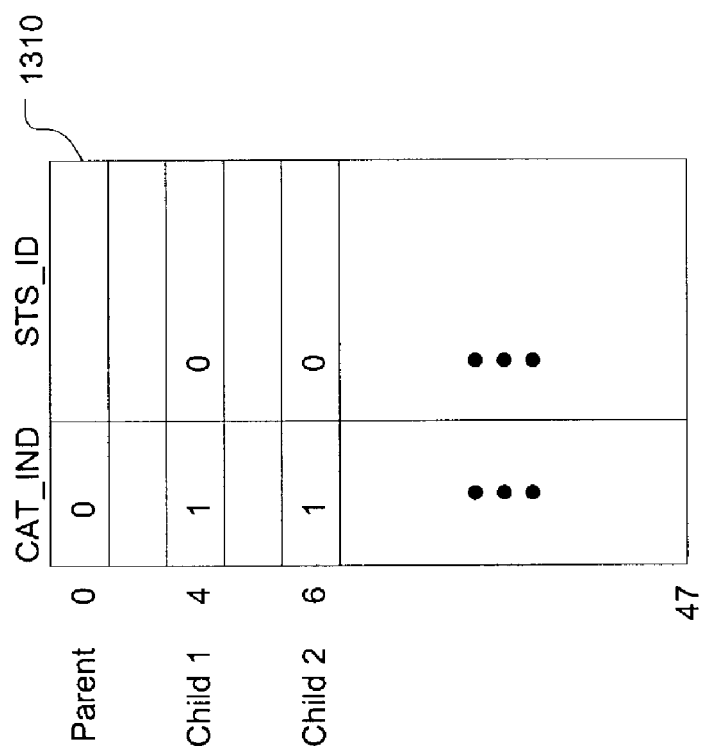
FIG. 11 is a block diagram illustrating an embodiment of a Tx concatenation table 1310 that maps parent-child relationships for STS-1's.

FIG. 11 is a block diagram illustrating table 1310 stored by memory 1235 in greater detail. Memory 1235 maps parent-child relationships for STS-1's, and is used by PTG 1232 in processing the payloads for output. Memory table 1310 includes 48 entries, respectively corresponding to 48 STS-1's as required by a SONET OC-48 frame, for example. The table 1310 includes a first submemory having concatenation indicators (CAT_IND) and a second sub-memory storing STS identifiers (STS_ID). The concatenation indication field indicates whether the corresponding STS-1 is a parent or child, marked by 0 and 1, respectively. The STS-ID field contains parent STS-1 ID's for children STS-1's.

PTG 1232 uses table 1310 to determine which FIFO's are to be concatenated. For example, based on table 1310, PTG 1232 determines that payloads in FIFO's #0, #4, and #6 are to be concatenated. FIFO's #4 and #6 are children of parent payload in FIFO #0, as indicated by the 0 in each of the STS_ID's for STS-1's #4 and #6.

Figure 12:
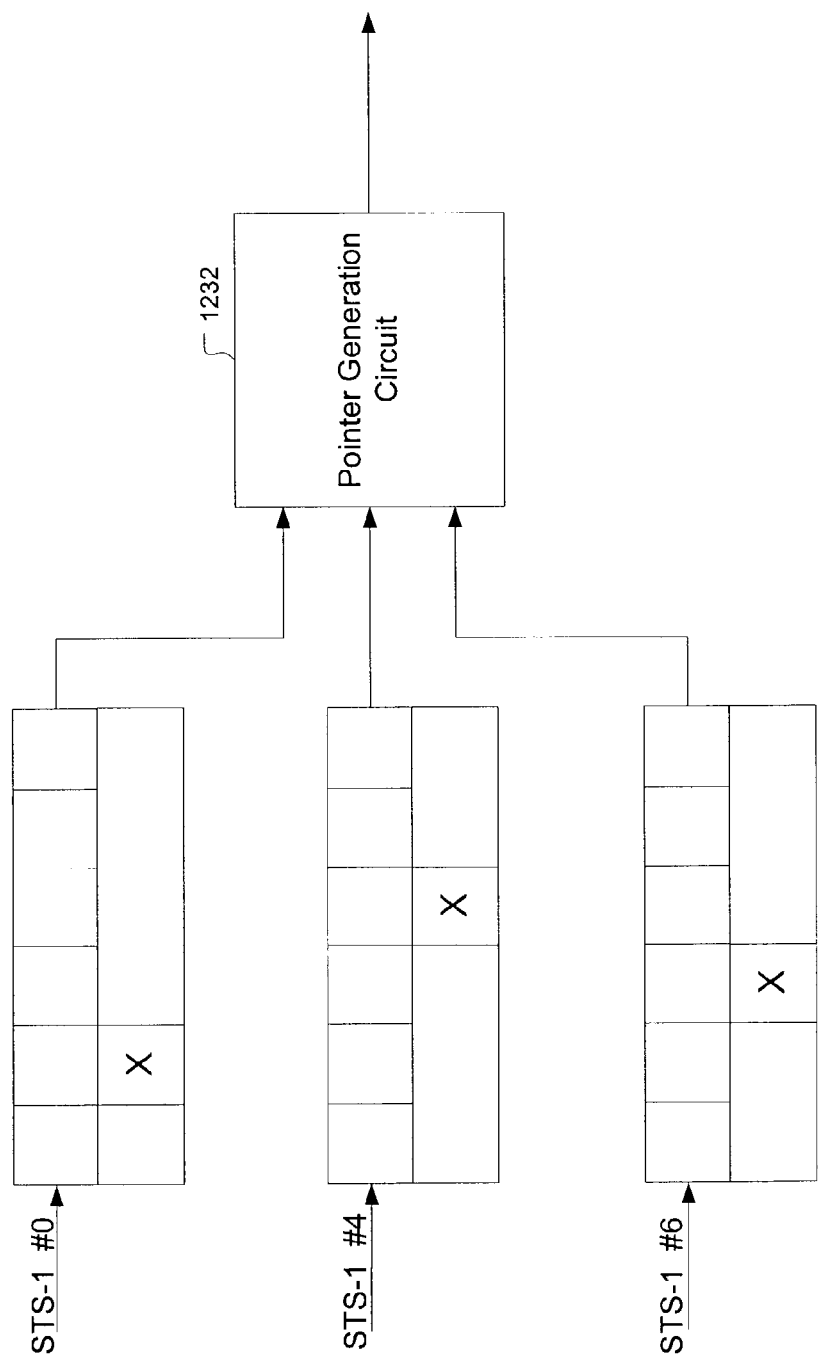
FIG. 12 illustrates payloads starting at different points in each FIFO.

FIG. 12 illustrates payloads starting at different points in each FIFO. The payload information moving through each FIFO includes data identifying where payloads stop and start based on the pointer. For purposes of illustration, X's in the FIFO's mark where a new payload starts. For example, FIG. 12 illustrates three FIFO's corresponding to three concatenated STS-1's, namely, STS-1 #0, STS-1 #4, and STS-1 #6. The STS-1 payload is to be concatenated with the STS-1 payloads in FIFO's #4 and #6. Each payload, however, starts at a different location of the respective FIFO, as indicated by the X's.

PTG 1232 aligns these concatenated payloads so that each outgoing SONET frame of a series of concatenated frames has the same pointer value in the transport overhead; otherwise, the payloads of the concatenated time slots cannot be properly read downstream from the switch. The pointer values are also used by PTG 1232 to perform any necessary byte stuffing.

Transparent Flexible Concatenation

Before proceeding further recall that in the flexible concatenation invention discussed above, the child timeslots of the STS-Nc contain the concatenation identifier in the pointer field and only the parent timeslots contain pointer values. In contrast, in transparent flexible concatenation (the subject of the invention described below) both parent and child timeslots contain independent pointer values. The STS-N data stream, therefore, appears to have all timeslots defined as STS-1s. One of the advantages of this approach is that non-transparent line-terminating network elements, which do not support flexible concatenation and which also are located between two transparent network elements (NE) that do support flexible concatenation, are still capable of passing the flexibly concatenated STS-N without error. The non-transparent NE can perform pointer processing of the STS-1s independently without corrupting the payload.

In other words, transparent flexible concatenation allows traffic to appear as independent STS-1's and permits transport across optical networks that include non-transparent network elements. In other words, transparent flexible concatenation converts flexibly concatenated traffic into a format including STS-1 frames such that transparent transport is possible even across non-transparent network elements having no ability to handle flexibly concatenated traffic.

The inventive solution provides the capability to transmit all STS-Nc sub-rate signals in the SONET/SDH frame as all STS-1s and then to restore the STS-1s back into the desired STS-Nc sub-rate signals at the receiving side. The ability to do this allows the inventive system to "hide" non-standard concatenated signals-transmitted through non-transparent facilities. This is important since these non-transparent facilities need to auto-detect standard concatenation in order to apply pointer justifications. Non-transparent facilities typically include line termination equipment which is not capable of forwarding pointer bytes on non-standard concatenated timeslots and, thus, cannot properly process non-standard concatenated timeslots.

The table shown in FIG. 13 indicates the standard groupings for an OC-48 interface. From this table, it is obvious that there are 16 standard STS-3*c* type configurations. The first STS-3*c* contains STS-1s (time-slots) #1, #17, and #33. This group of 3 time-slots represents a standard STS-3*c*. Any group of 3 time-slots not represented in this table as one of the standard STS-3*c* signals is considered non-standard. For example, an STS-3*c* containing time-slots #1, #3, #35 would be a non-standard STS-3*c*.

Note that the first STS-12*c* contains timeslots #1–#4, #17–#20, and #33–#36. This group of 12 time-slots makes up a standard STS-12*c*. The other 3 standard STS-12*c* signal structures are indicated in the table. Any group of 12 time-slots not represented in this table as a standard STS-12*c* is considered a non-standard STS-12*c* signal. Also, any group of time-slots not containing 1, 3, 12, or 48 time-slots is considered to be non-standard with respect to an OC-48 interface. Note that neither an STS-1 nor an STS-48*c* on an OC-48 interface can be non-standard.

Network elements that are able to read the STS-1 pointer bytes (H1, H2) can decode the signal structure on a standard OC-48 interface primarily because the combinations of standard STS-12*c* and STS-3*c* sub-rate signals are limited. Being able to decode the sub-rate signal structure allows the network element the ability to adjust the SONET pointer bytes (i.e. make a pointer justification) when timing differences are introduced between the incoming signal and the outgoing signal.

Transparent network elements that are located between two other network elements, that support flexible concatenation, should not adjust the SONET payload and pointer bytes. However, there are certain scenarios where such network elements are not truly fully transparent.

An example of this is a 4:1 Nortel combiner, taking 4 OC-48s from a network element supporting flexible concatenation and multiplexing them into an OC-192 pipe. At the other end of the OC-192 pipe, the payloads need to be de-multiplexed back into 4 separate OC-48s going back into another network element supporting flexible concatenation. To account for the timing differences between the 4 OC-48s and the OC-192, the combiner has no choice, but to adjust the SONET payload and pointers. If the SONET payload structure contains standard STS-Nc sub-rate signals, then this is not an issue. However, in the case of a network element, which supports flexible concatenation and can produce non-standard STS-Nc sub-rate signals, it becomes a problem for the Nortel combiner, which cannot determine the payload structure.

Figure 14:
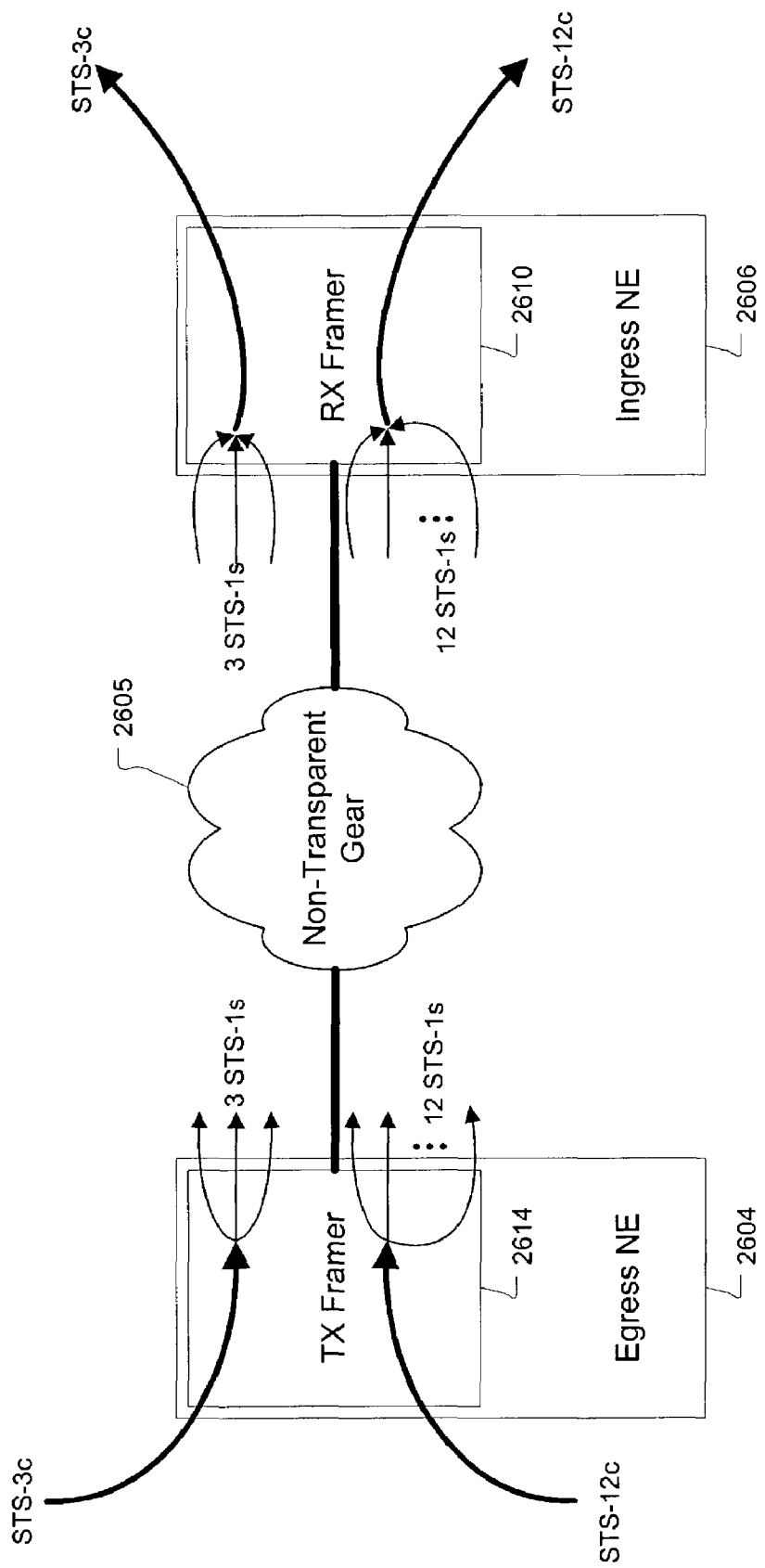
FIG. 14 is a high-level block diagram of the transparent flexible concatenation illustrating basic elements of signal conversion and locations of a transmit framer and receive framer according to the invention.

To solve these problems, a new framer 2618 (including a transmit framer 2614 and a receive framer 2610) has been invented as generally illustrated in FIG. 14. Recall that framers are typically implemented in transmit/receive pairs as illustrated in FIG. 5. The inventive framer 2618 has the ability to convert all the non-standard (and standard) concatenated payloads into STS-1s (with no concatenated structure). This forces the intermediate facility equipment to detect a signal structure of all individual STS-1s. In this way if any pointer justifications are required, they are correctly applied to all the STS-1s that were created from the original STS-Nc. At the other end of the fiber (which should contain another of the inventive framers 2618 or at least the receive framer 2610 for proper receipt and processing), the receive framer 2610 multiplexes the STS-1s back into their desired concatenated payloads (based upon the user- or SNC-configuration of the signal structure at that endpoint as further discussed below).

FIG. 14 illustrates an example the inventive framer 2618 (including transmit framer 2614 and receive framer 2610) converting an STS-12c and an STS-3c. FIG. 14 illustrates a non-standard STS-3c and a non-standard STS-12c connection between 2 different network elements 2604 and 2606 both of which support transparent flexible concatenation. For the sake of simplicity, only one direction of the connections and only one side of each framer pair 2610, 2614 is shown on each NE 2604, 2606. The path between the two network elements 2604, 2606 that support transparent flexible concatenation, goes through some non-transparent network gear 2606 meaning that the SONET pointers may need to be adjusted. Both of the framers 2618 at each end of the fiber are configured for transparent concatenation. Because of this, each of the non-standard connections will be converted into individual STS-1s by the transmit framer 2614. It should be noted that connections of standard concatenation may also be converted into individual STS-1s by the invention.

In the case of the STS-3c connection, the transmit framer 2614 receives it. After processing the payload (including the path overhead (POH)), the transmit framer 2614 breaks the STS-3c up into 3 STS-1s, each with its own pointer, which has no indication of concatenation. As the 3 STS-1s go through the non-transparent network gear 2605, their payloads and pointers may encounter justification due to timing differences in this network gear and the network elements that support flexible concatenation. The 3 STS-1s arrive at the receive framer 2610 and are "re-concatenated" back into an STS-3c. After the STS-3c is rebuilt, then its POH can be processed. A similar process occurs for the STS-12c in the example.

This re-concatenation occurs since either the user or OSRP has configured the framer 2610. Framer set up or configuration involves distributing connection information to each network element when a connection is added, deleted, or modified. The connection information may be distributed using, for example, OSRP, the DCC bandwidth in the transport overhead, or even an out-of-band signal pathway. The network elements use the connection information to program the receive and transmit framers 2610, 2614 including the receive and transmit concatenation tables 2810, 2310, respectively. In order to re-concatenate the original frame, the receive concatenation table 2810 is programmed with the same values as the transmit concatenation table 2310 as further described below.

Figure 15:
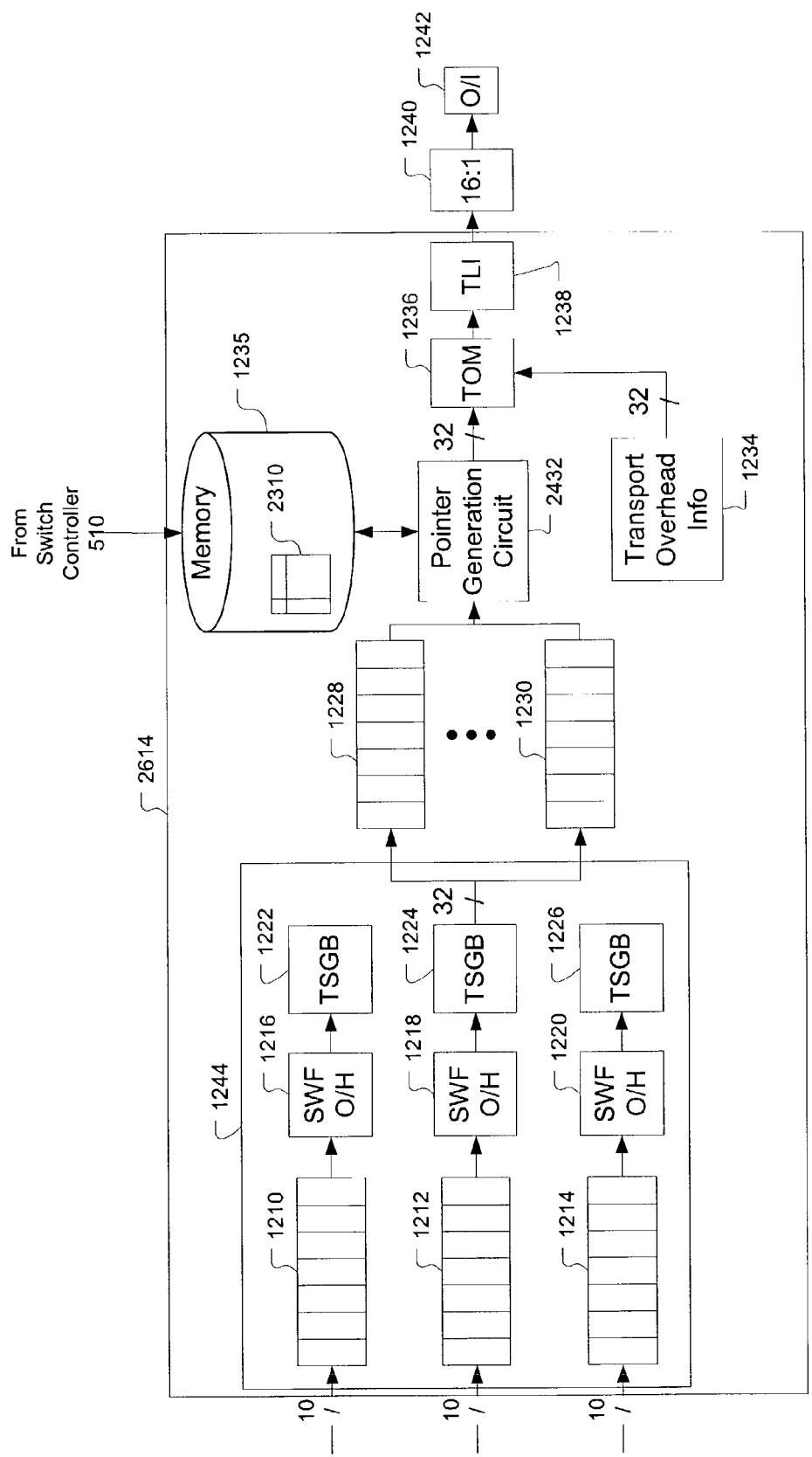
FIG. 15 is a block diagram illustrating a transmit framer capable of performing transparent flexible concatenation according to the invention.

FIG. 15 illustrates a particular implementation of the inventive transmit framer 2614 which has many common elements with the framer 614 shown in FIG. 10 with like reference numbers indicating like parts and functions.

As shown in FIG. 15 output circuit or Tx stage 2614 receives flexibly concatenated data frames (e.g. internal switch frames from the switch fabric), pulls the data out of the data frames, and converts the flexibly concatenated time slots into a series of STS-1s, and transmits the converted data frames.

Like the TX stage 614, Tx stage 2614 includes a Tx data interface (TDI) 1244, 48 FIFO buffers, FIFO #1 1228 through FIFO #48 1230, transport overhead information module (TOI) 1234, and transmit line interface (TLI) 1238. The output of Tx stage 2614 may include, for example, a 16:1 output multiplexer 1240 and output interface (O/I) 1242.

TDI 1242 receives internal frames from three 10-bit buses. The frames are first stored in FIFO's 1210, 1212, and 1214, which adjust the frames to correct timing problems caused by skew and other factors.

The internal frames are transferred from FIFO's 1210, 1212, and 1214, to SWF O/H's 1216, 1218 and 1220, which process the internal switch frames. Internal switch frames are comprised of alternating time slot groups (TSGs) and processor communication channels (PCC's). Each TSG comprises a group of eighteen time slots, for example, with one byte of data transmitted per time slot. The PCC's are passed from switch controller 510 through the framer to the switch elements. For example, commands may be sent by switch controller 510 to the switch elements over PCC's. Responses and error notifications are sent by the switch elements back to the host over the PCC's. Each PCC consists of five five-byte sub-fields which are interleaved with data bytes. Each internal switch frame also includes idle bytes 320 that are inserted between switch frames to align them on system-dictated switch frame boundaries and to synchronize clocks in the system.

SWF O/H's 1216, 1218 and 1220, process the internal switch frames by pulling out the transport overhead information, PCC's, and TSG's from the internal switch frames. SWF O/H's 1216, 1218 and 1220, transfer the TSG's to TSGB's 1222, 1224, and 1226. The TSG's are then multiplexed from TSGB's 1222, 1224, and 1226 onto a 32-bit data bus, to 48 FIFO's, FIFO #1 1228 to FIFO #48 1230. The 48 FIFO's store the payload to be loaded into outgoing SONET frames.

The 48 FIFO's transfer the SONET payload data to pointer generation circuit (PTG) 2432. PTG 2432 performs pointer generation for the outgoing frames in accordance with whether transparent/non-transparent transport is desired and according to the data originating in switch controller 510 and stored in memory 1235.

Figure 16:
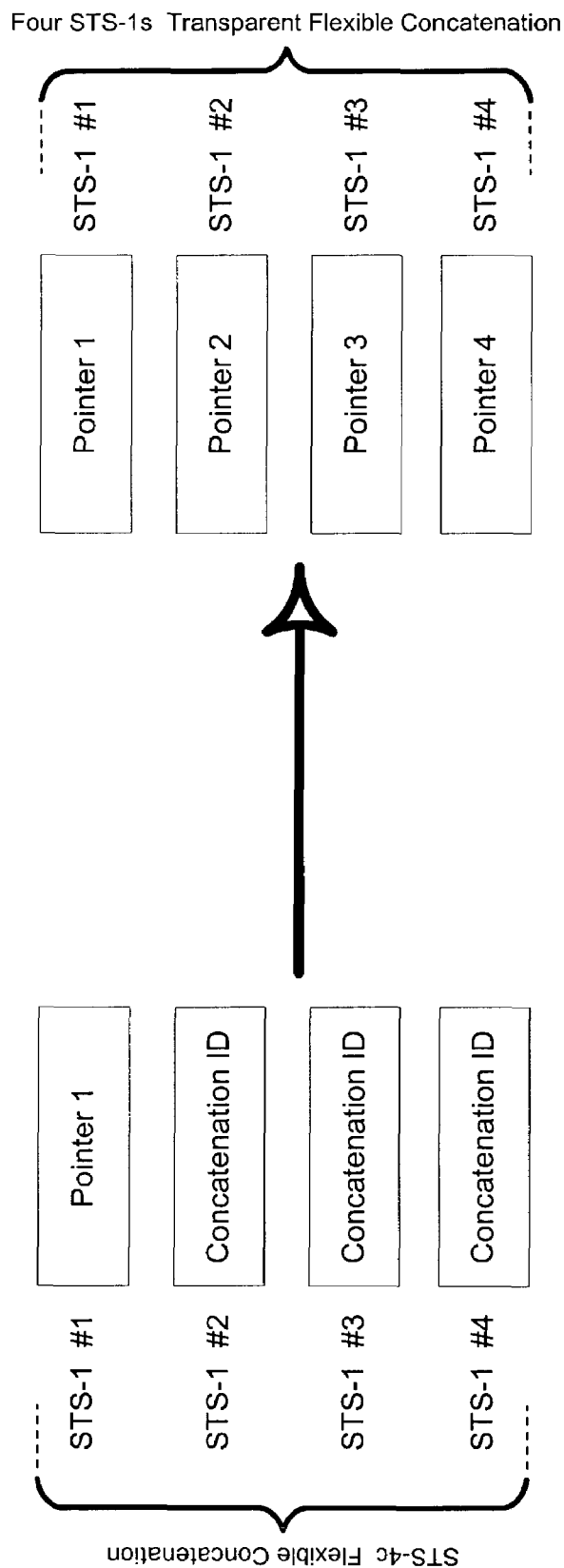
FIG. 16 illustrates pointer and concatenation ID processing for transforming a concatenated frame to a transparent concatenated frame according to the invention.

FIG. 16 illustrates converting an OC-4c (a flexibly concatenated frame) into four STS-1s each with its own pointer value. In particular, the first STS-1 ("parent") of the concatenated time slots is identified, and the parent's pointer is used as an explicit pointer for each of the remaining concatenated STS-1 time slots ("children"). Furthermore, no concatenation identifier is included in the converted frames as further illustrated by FIG. 16.

Transparent flexible concatenation also utilizes a transmit concatenation table 2310 stored in memory 1235 much like the concatenation table 1310 explained above in relation to flexible concatenation and shown in FIG. 11. FIG. 15 illustrates transmit concatenation table 2310 in the context of the transmit framer 2614. The transmit concatenation table 2310 may be stored as a data entity consistent with that shown in FIG. 13 or it may be stored in registers as illustrated in FIGS. 9(b) and 9(c).

Transmit concatenation table 2310 maps parent-child relationships for STS-1's, and is used by PTG 3432 in processing the payloads for output. Specifically, PTG 3432 uses the transmit concatenation table 2310 to set the child time-slot pointer information in the frames to the parent time-slot pointer information as graphically shown in FIG. 16. PTG 2432 multiplexes the payloads over a 32-bit bus to transport overhead multiplexor (TOM) 1236. TOM 1236 also receives transport overhead information from TOI 1234 over another 32-bit bus, for example, and combines the payloads from PTG 1232 and the transport overhead information from TOI for transfer to TLI 1238. TOM 1236 receives the payload data from the PTG Pointer Generation 2432 and the transport overhead data from the TOI Transport Overhead Information 1234. The TOM 1236 then multiplexes the payload and transport overhead into the outgoing SONET/SDH data stream. The TOM 1236 sends the SONET/SDH data stream to the TLI Transmit Line Interface 1238. TLI 1238 transfers the data over a 16-bit bus to the output of the framer, comprised of 16:1 multiplexer 1240 and O/I 1242.

Transparent flexible concatenation preferably can be enabled or disabled on a per-port basis. It is needed only on non-transparent networks that may carry flexibly concatenated traffic. In particular, transparent flexible concatenation is not needed on drop-side facilities. Since some network element framers may not support transparent flexible concatenation, software can block configuration of this concatenation feature on ports contained in such an older network element.

It is important for the user of transparent flexible concatenation to configure the network elements on each side of the fiber consistently (i.e. either both ends transparent concatenation or both ends non-transparent concatenation) for successful transport of SONET/SDH payloads.

Moreover, a network element that supports flexible concatenation can support both standard and non-standard concatenation. Cross-connects created by the user can be configured to contain standard or non-standard concatenated time-slots. The same is true of the drop-sides of a subnetwork connection (SNC). Depending upon the combinations of SNC types (i.e. STS-1, STS-3c, STS-12c, etc.) OSRP can allocate the time-slots on an OSRP line-side trunk such that the time-slots end up on non-standard boundaries or non-standard groupings of time-slots.

Figure 17:
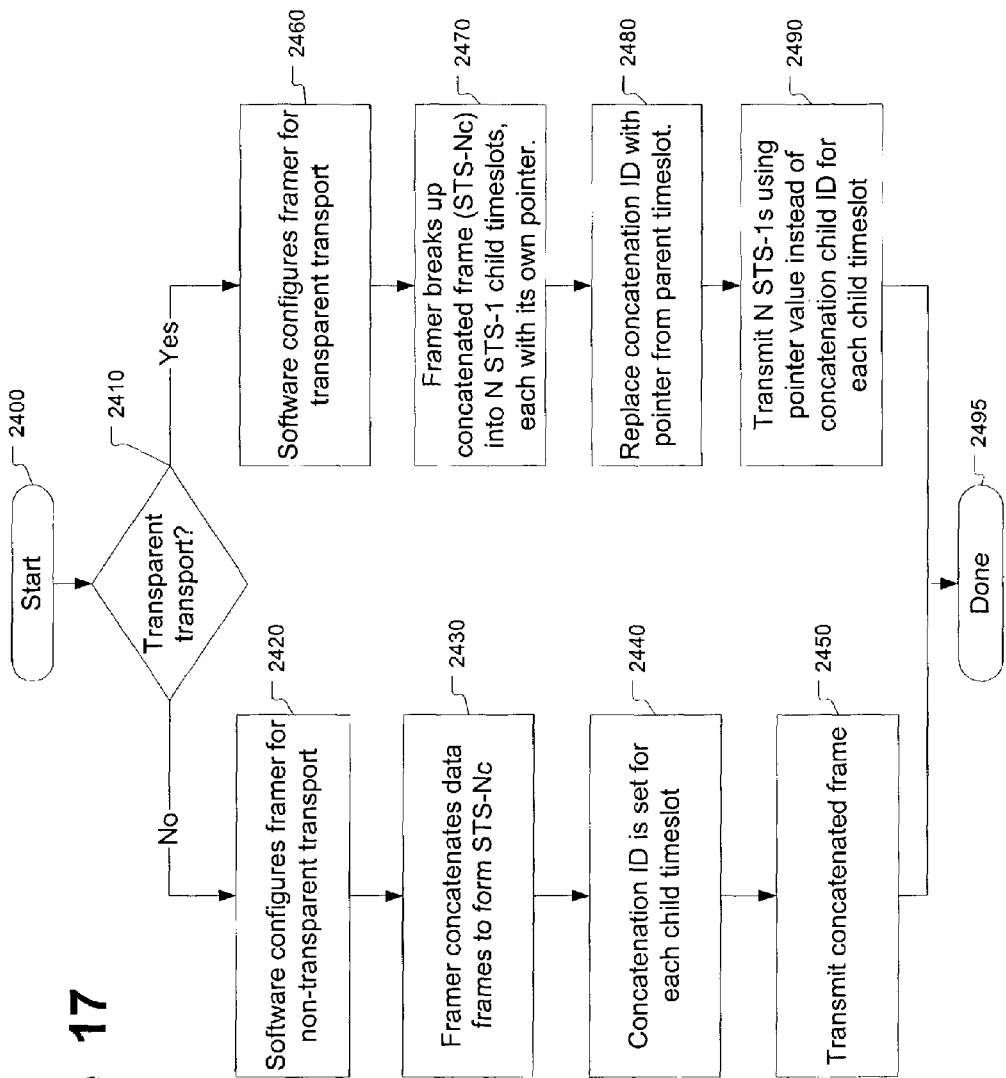
FIG. 17 is a high-level flowchart illustrating transmit functions for performing transparent flexible concatenation according to the invention.

FIG. 17 further illustrates the transparent flexible concatenation process that may be implemented by the transmit framer 2614. Upon starting (2400) the process, the invention then queries (2410) whether the transport should be transparent or not. This is a further reflection of the invention's ability to toggle the transparency function on or off and the query (2410) may access an internal register (not shown), memory 1235, a data frame, or be configured by a user via a GUI to determine whether the transport should be transparent or not.

If non-transparent transport is desired, the invention follows the left branch of the decision tree which illustrates flexible concatenation including configuring (2420) the framer for non-transparent transport, concatenating (2430) data frames to generate a concatenated frame (e.g. STS-Nc), setting (2440) the concatenation ID for each child timeslot of the concatenated frame, and transmitting (2450) the concatenated frame. Instead of this process, the non-transparent transport may include one or more conventional concatenation process(es).

If transparent transport is desired, then the invention follows the right branch of the decision tree. First, software configures (2460) the framer 2614 for transparent transport which includes transferring the contents of the transmit concatenation table 2310 to the receive concatenation table 2810. It is to be noted that the configuration 2460 may occur when a connection is established and may utilize one or more data pathways such as OSRP, DCC or an out-of-band signal.

The framer 2614 then breaks up (2470) the concatenated frame (STS-Nc) into N STS-1 child timeslots each with its own pointer as generally illustrated in FIG. 16 and such that no concatenation ID is set. Instead of setting the concatenation ID the invention replaces (2480) the concatenation IDs with the pointer from the parent timeslot.

The framer 2614 may then transmit (2490) the N STS-1s using the pointer value from the parent instead of the concatenation child ID for each of the child timeslots. The child timeslot payloads should be aligned with the parent timeslot payload before transmission. The B3 path bit interleaved parity ("BIP") byte will not be modified for the concatenated STS-1s and therefore intermediate path terminating equipment (PTE) will not be able to correctly monitor the B3s. Also, the H4 multi-frame indicator is preferably not modified. At this point, the process is done (2495) but may continue in an iterative fashion for subsequent frames such as by looping back to step 2470.

Figure 18:
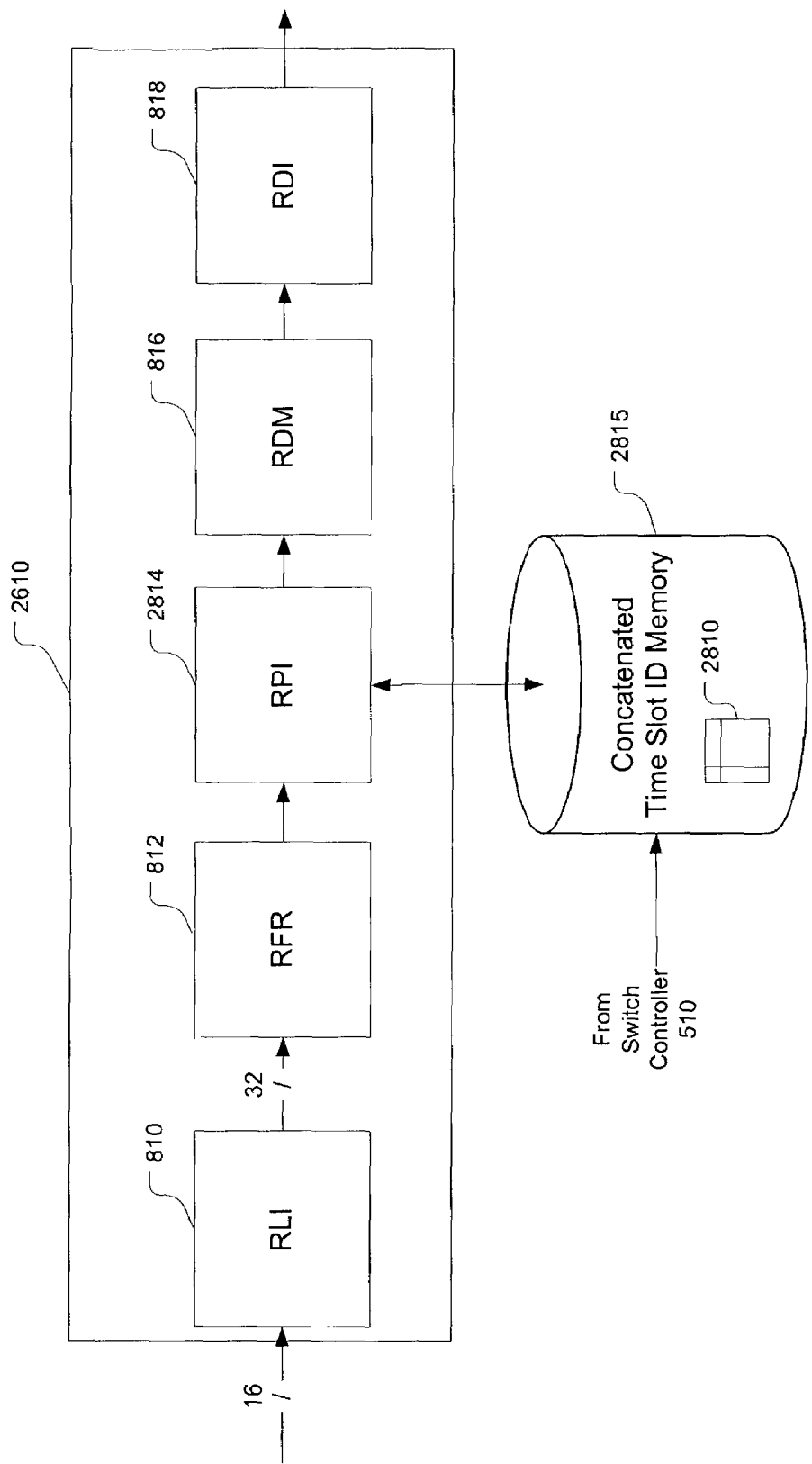
FIG. 18 is a block diagram illustrating a receive framer capable of performing transparent flexible concatenation according to the invention.

The transmit framer 2614 and a downstream receive framer 2610 coordinate concatenation via the transmit concatenation table 2310 and the receive concatenation table 2810. The transmit concatenation table 2310 is programmed to indicate the concatenation structure of the transmitted SONET/SDH data stream. The receive framer 2610 contains a receive concatenation table 2810 as shown in FIG. 18 and which is programmed to indicate the concatenation structure of the received SONET/SDH data stream. The transmit framer and the receive framer on the other end of a connection span have their respective concatenation tables programmed identically and communicate via, for example, OSRP, DCC etc. The transmit and receive concatenation tables 2310, 2810 are programmed in the same fashion regardless of whether either flexible concatenation or transparent flexible concatenation is used. When transparent flexible concatenation is enabled on the receive framer 2610, the receive pointer interpretation 2814 logic will perform pointer processing on all time-slots on an STS-1 basis. The B3 path BIP performance monitoring logic will check the path BIP for each STS-Nc even if the STS-1 time-slots within the STS-Nc are not payload aligned.

FIG. 18 is a block diagram illustrating receive framer 2610 (Rx stage) 610 in greater detail which has many common elements with the framer 614 shown in FIG. 6 with like reference numbers indicating like parts and functions.

Receive framer 2610 is comprised of receive line information element (RLI) 810, receive framer (RFR) 812, a pointer determining circuit or receive pointer interpreter (RPI) 2814, receive data memory (RDM) 816, and receive dropside information element (RDI) 818. RLI 810 receives data over the 16-bit bus and reformats the data to 32 bits, for example. RFR 812 receives the 32-bit data, and byte-aligns and frame-aligns the incoming data. The byte- and frame-aligned data is then transferred to RPI 2814.

Based on the contents of receive concatenation table 2810, RPI 2814 determines which time slot is a parent, and which slots are the associated children. The receive pointer interpretation 2814 logic will perform pointer processing on all time-slots on an STS-1 basis if transparent flexible concatenation is enabled.

Pointer information output from R-PI 2814 is supplied to RDM 816, which acts as a first-in first-out (FIFO) buffer to store data received from RPI 2814. The pointer information is used to synchronize the time slots stored in the FIFO and perform byte stuffing. The result is a re-concatenated frame having the same structure as the original concatenated frame processed by the upstream transmit framer 2614 even if the concatenation structure is non-standard and even if a midstream network element is nontransparent gear 2605 as illustrated in FIG. 14.

Next, the time slots may be fed to RDI 818, where they are modified to have the above-described internal frame format. RDI 818 receives signals (not shown), such as frame synchronization signals and timing signals that determine when a frame will be launched from Rx stage 610 to ingress stage 612, thereby ensuring that the internal frames enter the switched fabric in a synchronized manner.

If the receive framer 2610 is not part of a switch, the RDI 818 is not necessary and the RDM 816 may simply output SONET/SDH compliant signals.

Figure 19:
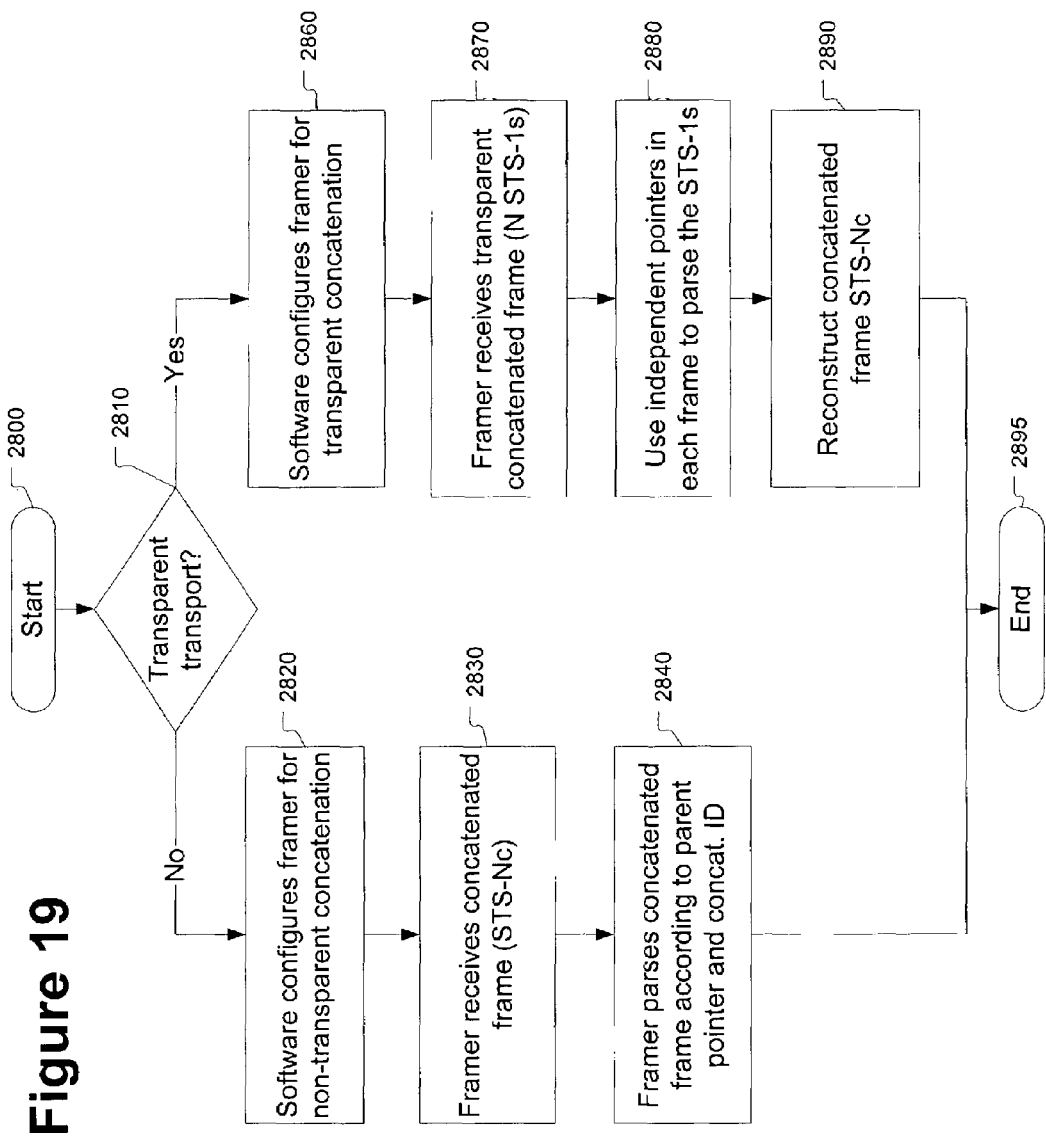
FIG. 19 is a high-level flowchart illustrating receive functions for performing transparent flexible concatenation according to the invention.

FIG. 19 further illustrates the transparent flexible concatenation process that may be implemented by the receive framer 2610. Upon starting (2800) the process, the invention then queries (2810) whether the transport should be transparent or not. This is a further reflection of the invention's ability to toggle the transparency function on or off and the query (2810) may access an internal register (not shown), memory 2815, a data frame, or be configured by a user via a GUI to determine whether the transport should be transparent or not.

If non-transparent transport is desired, the invention follows the left branch of the decision tree which illustrates flexible concatenation including configuring (2820) the framer for non-transparent transport, receiving (2830) a concatenated frame (STS-Nc), and parsing (2840) the concatenated frame according to the parent pointer and the concatenation ID. These non-transparent transport receive functions are either conventional or utilize the flexible (arbitrary) concatenation methods described above and need not be discussed further here.

If transparent transport is desired, the invention follows the right branch of the decision tree which illustrates transparent flexible concatenation including configuring (2860) the framer for transparent transport, receiving (2870) a transparent "concatenated" frame which is a series of N STS-1s as described above; and using (2880) the independent pointers in each STS-1 frame to process the frames. In other words, the using (2880) step performs pointer processing on all time-slots on an STS-1 basis. The invention may then reconstruct (2890) or otherwise re-concatenate the original STS-Nc by accessing the receive concatenation table 2815 which contains the concatenation structure of the transmitted SONET/SDH data stream and permits re-association of the original parent frame and child frames.

One advantage of the invention is that there are no limit on the number of hops a sub-network connection (SNC) can take due to skew. For example, the transmit framer 2614 realigns child timeslot payloads with the parent timeslot payload before transmission. This means skew among the STS-1's comprising a given STS-Nc is removed on a hop-by-hop basis, hence keeping it from accumulating end-to-end.

A second advantage of the invention is that the intermediate path performance monitoring ("PM") is supported. Therefore, the receive portion of the framer of the line module can compute the path ("B3") or bit interleaved parity ("BIP") for each STS-Nc even if the STS-1 timeslots within the STS-Nc are not payload aligned.

In conclusion, systems and methods consistent with the invention provide for transparent flexible concatenation of data frames. It will be apparent to those skilled in the art that various modifications and variations can be made to the methods and apparatus for implementing flexible concatenation consistent with the present invention, and in construction of a network using such systems, without departing from the scope or spirit of the invention. For example, although the figures illustrate elements communicating with each other over communication paths in the form of buses and dedicated lines, it should be understood that the communications paths may take any form of communication path that is capable of transferring the required information.

Although the embodiment has been described with respect to SONET, the apparatus and methods may also be used in environments other than SONET. More particularly, methods and apparatus consistent with the invention may be used to arbitrarily concatenate switch frames or other types of information being communicated. Although the invention has been described in terms of SONET it is not limited to complying with this standard. For example, the invention may be applied to the synchronous digital hierarchy (SDH) standard. In other words, the SDH functionality and the SONET functionality with respect to transparent flexible concatenation will be the substantially the same.

Furthermore, the invention is not limited to the data rates described above. Such data rates are particular examples for illustration purposes only.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing concatenated frames, comprising:
  receiving a concatenated frame having a parent timeslot with a pointer and at least one child timeslot with a concatenation identifier;

breaking the concatenated frame into a plurality of non-concatenated frames each of which has a pointer and none of which has a concatenation identifier;

sharing concatenation table information with a downstream network element, the concatenation table information identifying a concatenation structure of the concatenated frame received by said receiving step; and transmitting the plurality of non-concatenated frames.

2. The method according to claim 1, further comprising:
replacing the concatenation identifier for each of the child timeslots in the non-concatenated frames with the pointer from the parent timeslot.

3. The method according to claim 1,
wherein the concatenated frame and the plurality of non-concatenated frames are compatible with SONET or SDH standards.

4. The method according to claim 1,
wherein the concatenated frame is in the form of an STS-Nc, the plurality of non-concatenated frames is in the form of an STS-1 and the plurality is equal to N.

5. The method according to claim 1, wherein the concatenated frame utilizes non-standard concatenation,
said breaking step comprises breaking the non-standard concatenated frame into a plurality of non-concatenated frames that may be transparently processed by a network element receiving the non-concatenated frames transmitted by said transmitting step.

6. The method according to claim 5, wherein the non-standard concatenation includes non-standard concatenation timeslots or groupings.

7. The method according to claim 5, wherein the non-standard concatenation includes STS-Nc or SDH-Nc where N is not an integer multiple of three.

8. An apparatus for processing concatenated frames, comprising:
a plurality of buffers at least some of which store a corresponding payload of a concatenated frame, the concatenated frame including a parent timeslot having a pointer and at least one child timeslot having a concatenation identifier; and
a pointer generation circuit operatively connected to said buffers, said pointer generation circuit adapted to replace the concatenation identifier for each of the child timeslots with the pointer from the parent timeslot and to store concatenation information identifying a concatenation structure for the concatenated frame in a concatenation table;
wherein the concatenation table comprises concatenation information for a plurality of concatenated frames and is communicated to a downstream apparatus for processing concatenated frames.

9. The apparatus according to claim 8, further comprising:
a transport overhead multiplexer operatively connected to said pointer generation circuit, said transport overhead multiplexer combining transport overhead information with the payloads to construct a plurality of non-concatenated frames each of which has a pointer and none of which has a concatenation identifier.

10. The apparatus according to claim 8, said buffer including a plurality of FIFO buffers at least some of which store a corresponding payload of the concatenated frame.

11. The apparatus according to claim 8,
wherein the concatenated frame and the plurality of non-concatenated frames are compatible with SONET or SDH standards.

12. The apparatus according to claim 8,
wherein the concatenated frame is in the form of an STS-Nc, the plurality of non-concatenated frames is in the form of an STS-1 and the plurality is equal to N.

13. The apparatus according to claim 8, wherein the concatenated frame utilizes non-standard concatenation.

14. The apparatus according to claim 8, wherein the concatenated frame utilizes non-standard concatenation and includes non-standard concatenation timeslots or groupings.

15. The apparatus according to claim 8, wherein the non-standard concatenation includes STS-Nc or SDH-Nc where N is not an integer multiple of three.

16. A framer, comprising:
a transmit framer circuit including
a plurality of buffers at least some of which store a corresponding payload of a concatenated frame, the concatenated frame including a parent timeslot having a pointer and at least one child timeslot having a concatenation identifier, and
a pointer generation circuit operatively connected to said buffers, said pointer generation circuit adapted to replace the concatenation identifier for each of the child timeslots with the pointer from the parent timeslot and to store concatenation information identifying a concatenation structure for the concatenated frame in a transmit concatenation table; and
a receive framer circuit receiving a plurality of transparently concatenated frames including N frames each having a pointer,
said receive framer circuit including:
a receive pointer interpreter circuit for parsing each of the transparently concatenated frames according to the pointers, and
a receive concatenation table operatively connected to said receive pointer interpreter circuit, said receive concatenation table communicates with said transmit concatenation table to store concatenation information for the plurality of transparently concatenated frames,
said receive framer circuit re-concatenating the transparently concatenated frames according to the concatenation information stored by said receive concatenation table.

17. A method, comprising:
receiving a plurality of transparently concatenated frames including N frames each having a pointer;
parsing each of the transparently concatenated frames according to the pointers;
accessing a receive concatenation table to re-concatenate the transparently concatenated frames, the receive concatenation table comprises concatenation information received from an upstream network element and the concatenation information identifies a concatenation structure of the plurality of transparently concatenated frames.

18. The method according to claim 17,
wherein the re-concatenated frame is in the form of an STS-Nc, the transparently concatenated frames are in the form of an STS-1 and the plurality is equal to N.

19. The method according to claim 17, wherein the re-concatenated frame utilizes non-standard concatenation including non-standard concatenation timeslots or groupings.

20. The method according to claim 19, wherein the non-standard concatenation includes STS-Nc or SDH-Nc where N is not an integer multiple of three.

* * * * *